United States Patent

Fukuda et al.

[11] Patent Number: 5,860,679
[45] Date of Patent: Jan. 19, 1999

[54] INFORMATION RECORDING MEDIUM, TWO-DIMENSIONAL CODE, INFORMATION REPRODUCTION SYSTEM AND INFORMATION REPRODUCTION METHOD

[75] Inventors: Hiroyuki Fukuda, Hachioji; Takao Tsuruoka, Machida; Seiji Tatsuta; Hiroshi Sasaki, both of Hachioji; Shinichi Imade, Iruma, all of Japan

[73] Assignee: Olympus Optical Co., Ltd., Tokyo, Japan

[21] Appl. No.: 542,220

[22] Filed: Oct. 12, 1995

[30] Foreign Application Priority Data

Oct. 14, 1994  [JP]  Japan .................................. 6-274272

[51] Int. Cl.[6] .................................................. B42D 15/00
[52] U.S. Cl. .................................................. 283/70; 283/93
[58] Field of Search .............................. 283/72, 93, 117, 283/70, 901, 113

[56] References Cited

U.S. PATENT DOCUMENTS 5,241,166  8/1993  Chandler .................................. 283/93
5,297,815  3/1994  Anderson et al. ..................... 283/93
5,577,774  11/1996  Morikawa et al. .................... 283/93

FOREIGN PATENT DOCUMENTS

670555 A1   9/1995   European Pat. Off. .
60-165503   8/1985   Japan .

Primary Examiner—Willmon Fridie, Jr.
Attorney, Agent, or Firm—Frishauf, Holtz, Goodman, Langer & Chick

[57] ABSTRACT

A marker detecting section detects markers formed at four corners of a block using binary image data of a two-dimensional code stored in a data memory. A marker's approximate center calculating section calculates the approximate centers of the detected markers. A pattern code detecting means detects a pattern code in accordance with format information of the two-dimensional code stored in a format memory. A marker's real center calculating section calculates the real centers of the markers from the detected pattern code and the format information using the error minimizing method. Based on the calculated real centers of the markers, a data code reading coordinate calculating section calculates reading coordinates for reading data dots of address code and data code areas from the data memory.

14 Claims, 31 Drawing Sheets

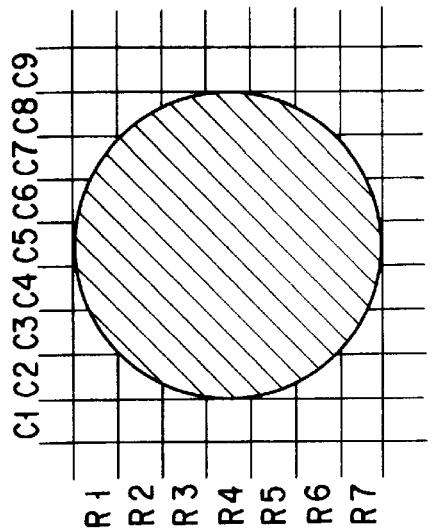
FIG. 3B
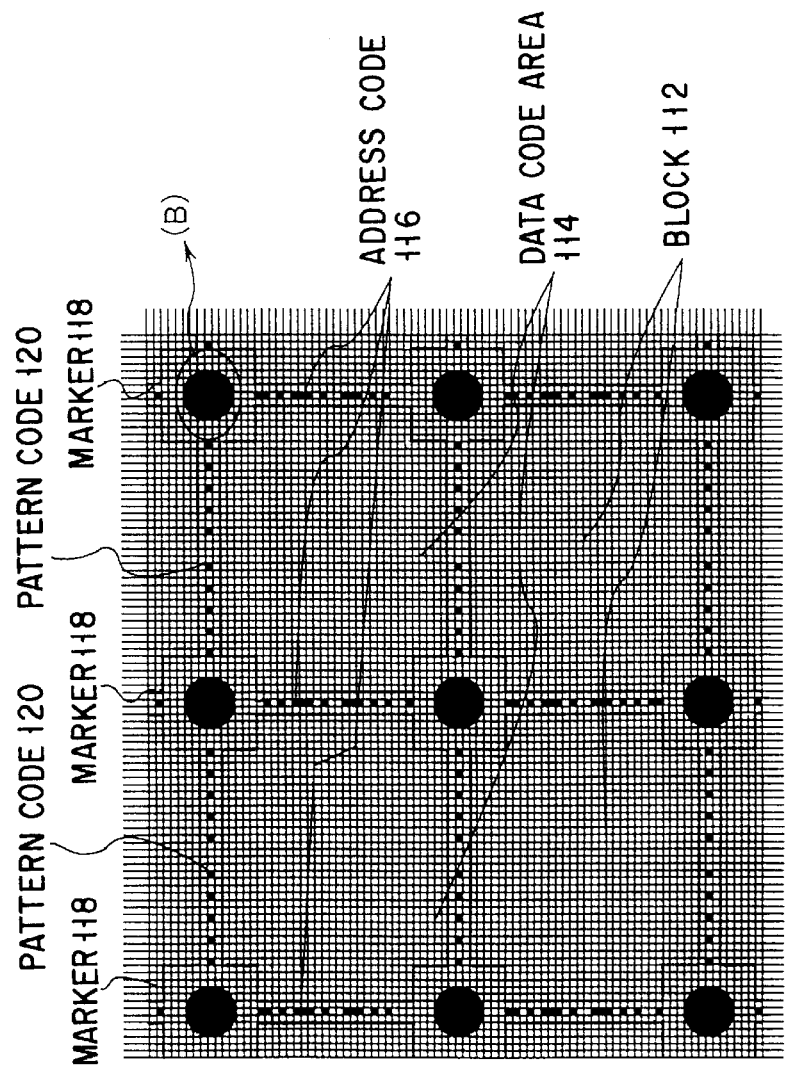
FIG. 3C
FIG. 3A

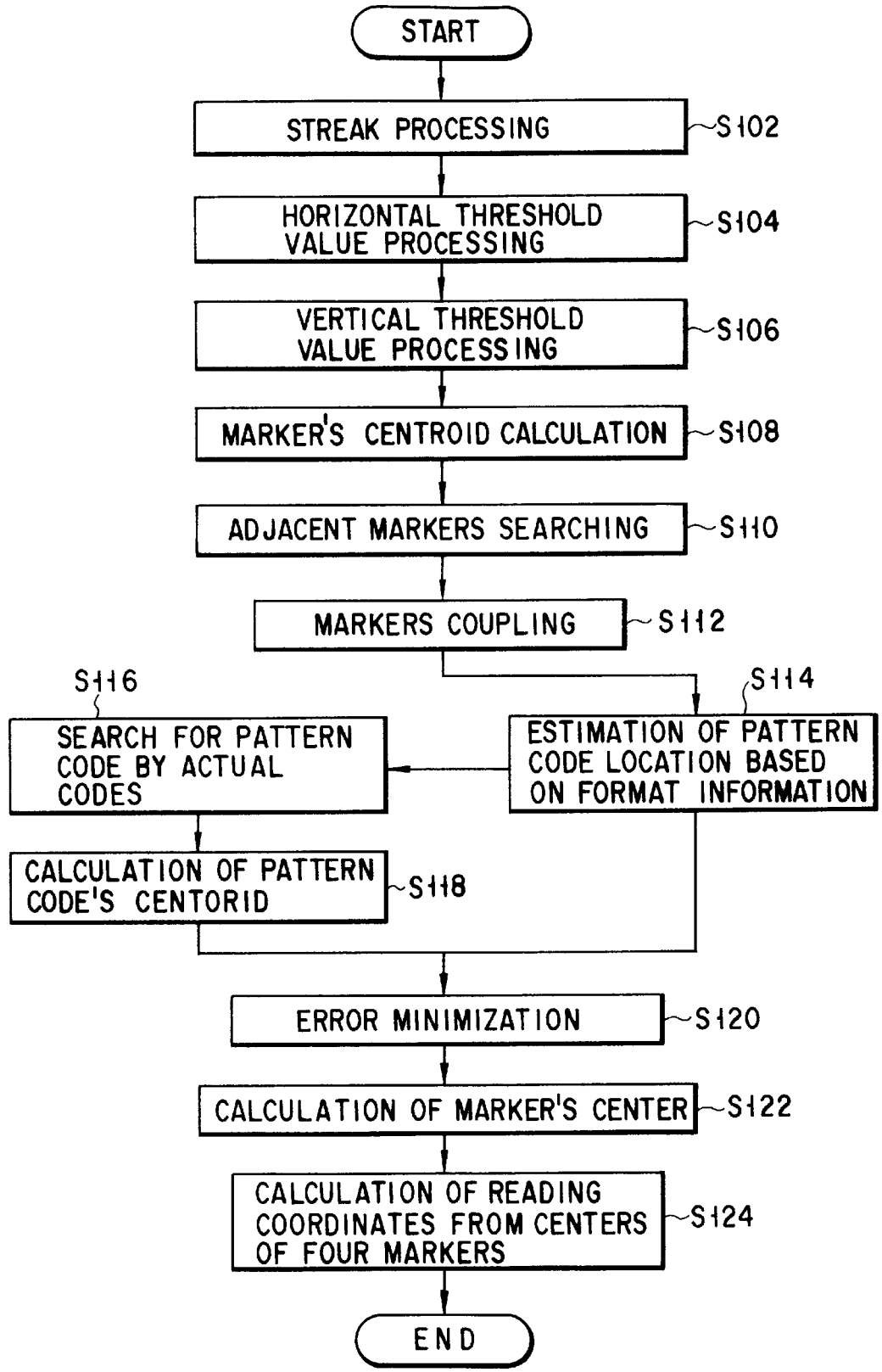
F I G. 4

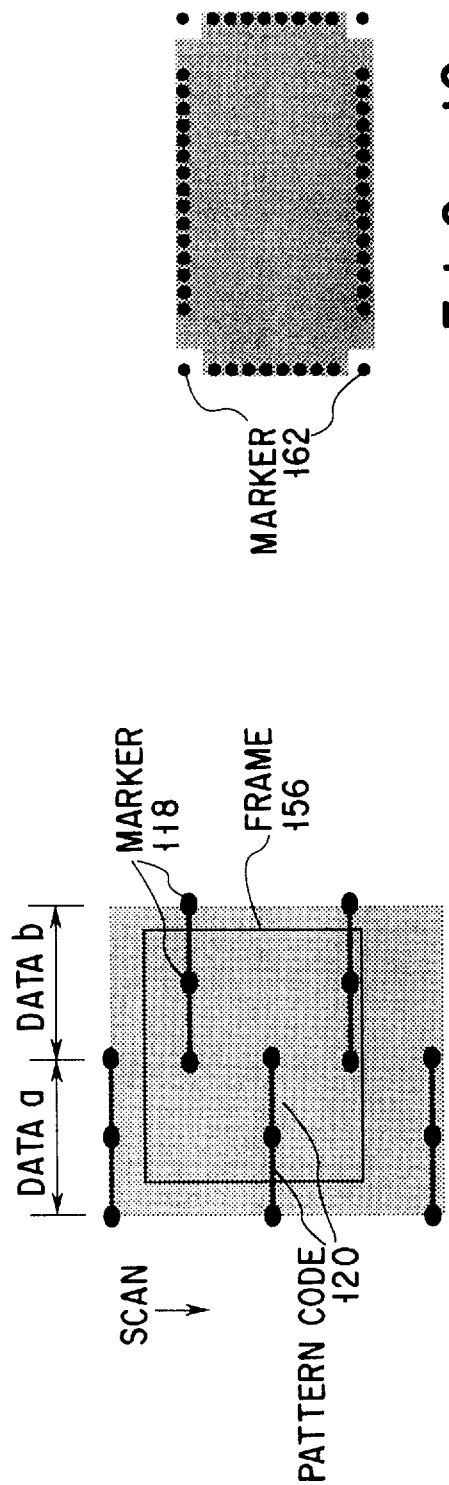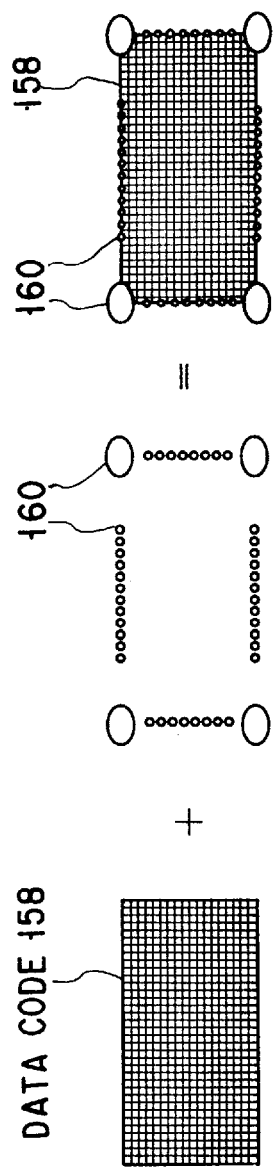

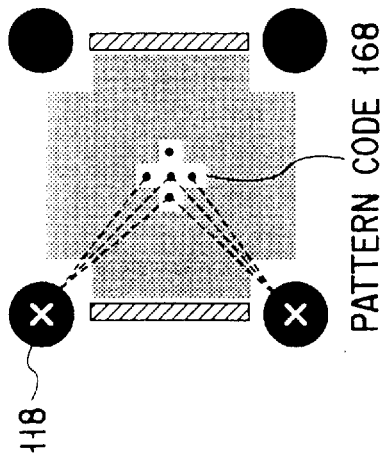
FIG. 21A PATTERN CODE 120
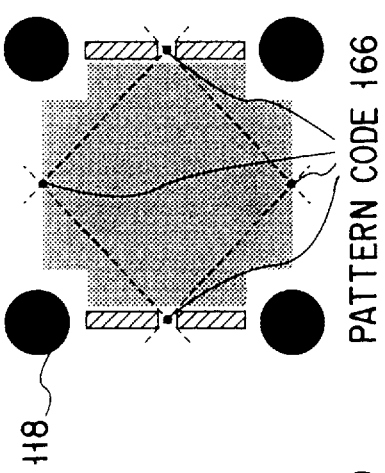
FIG. 21B PATTERN CODE 166
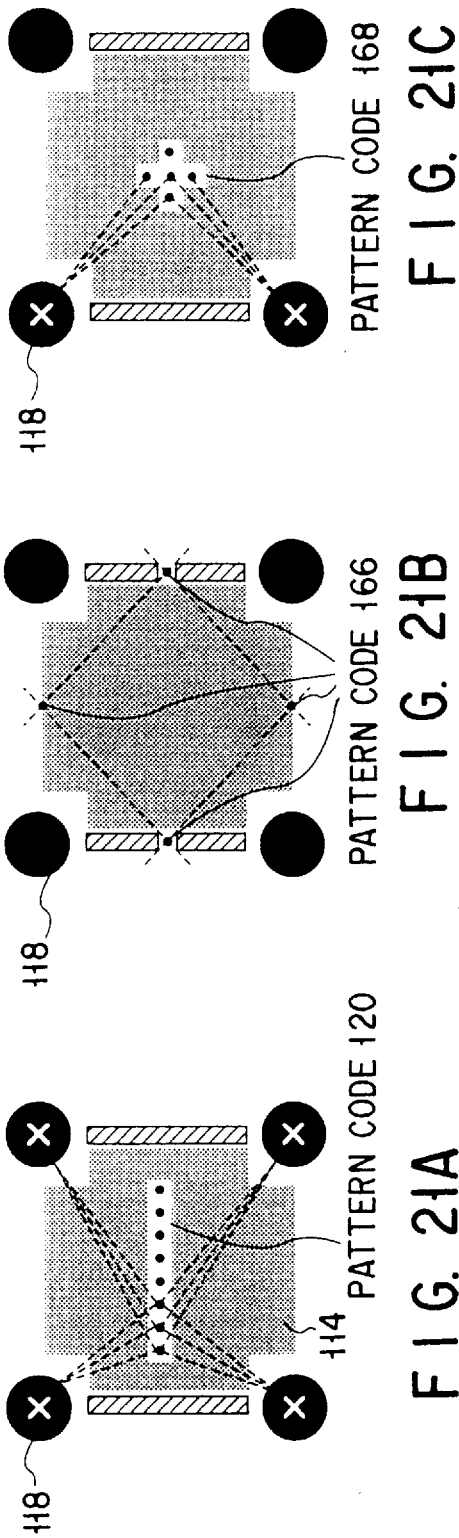
FIG. 21C PATTERN CODE 168
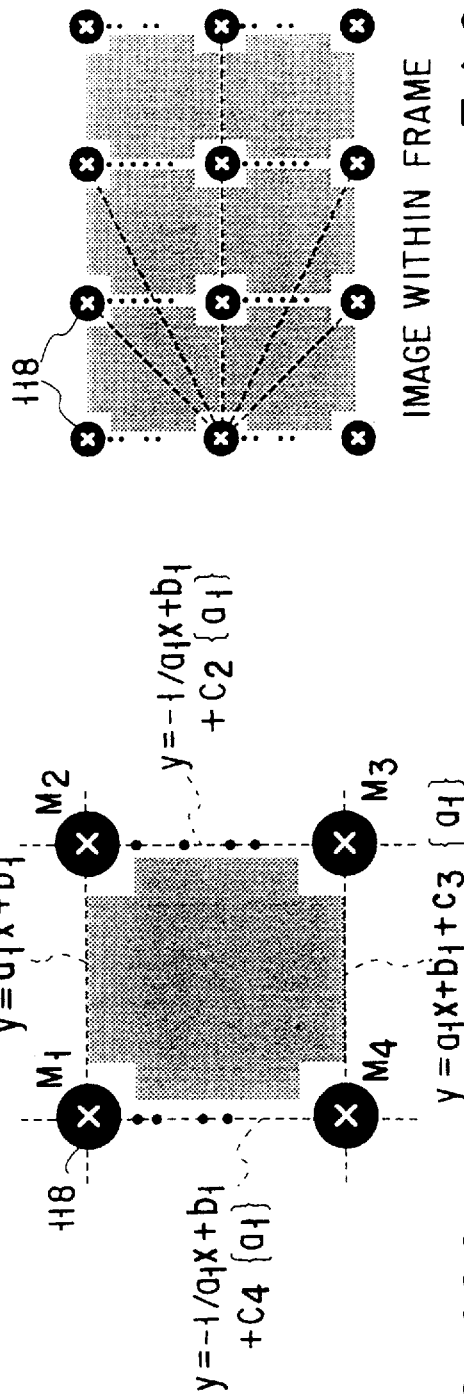
FIG. 22A
FIG. 22B IMAGE WITHIN FRAME

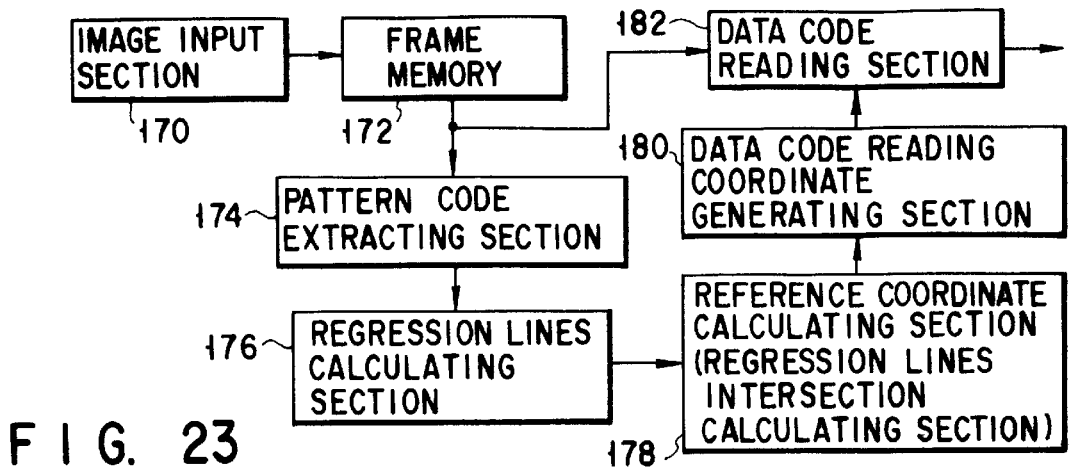
F I G. 23
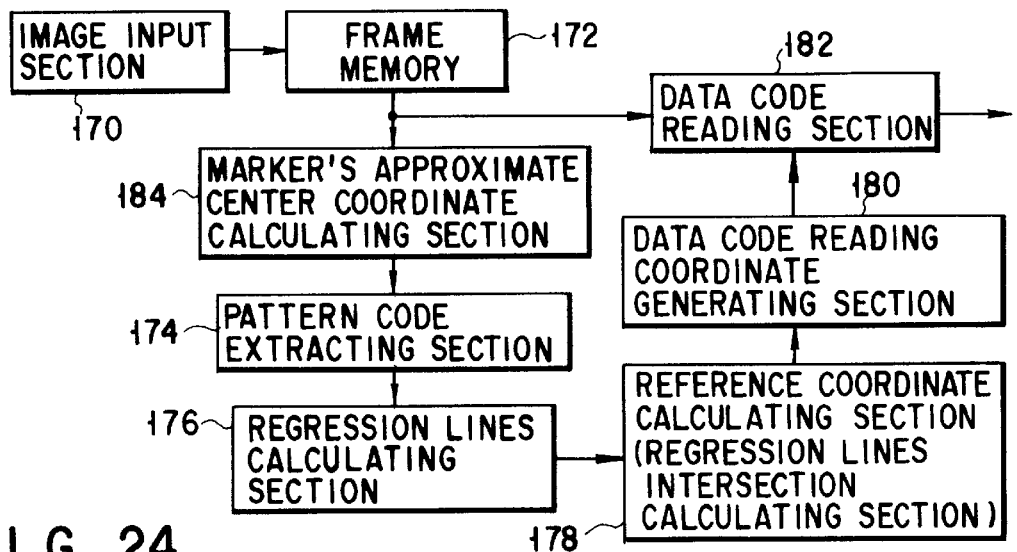
F I G. 24
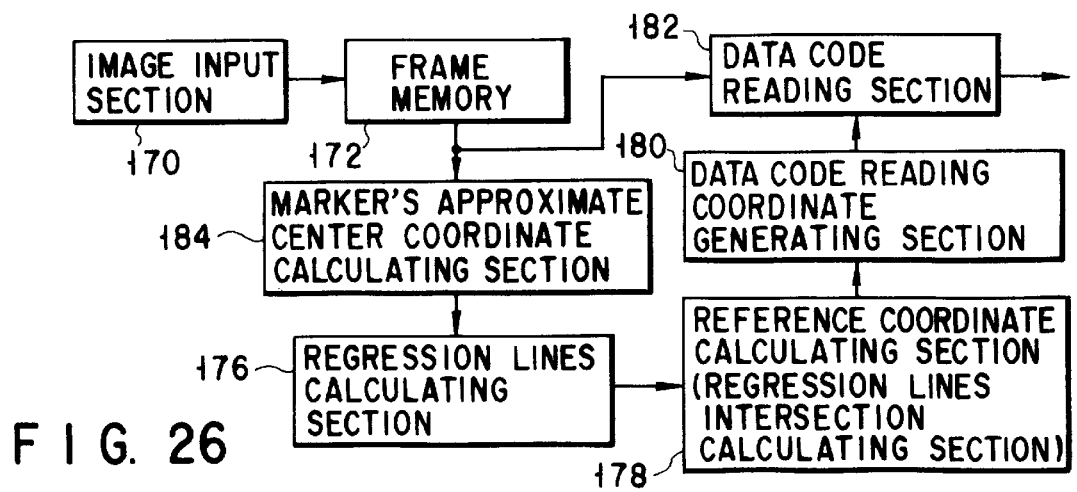
F I G. 26

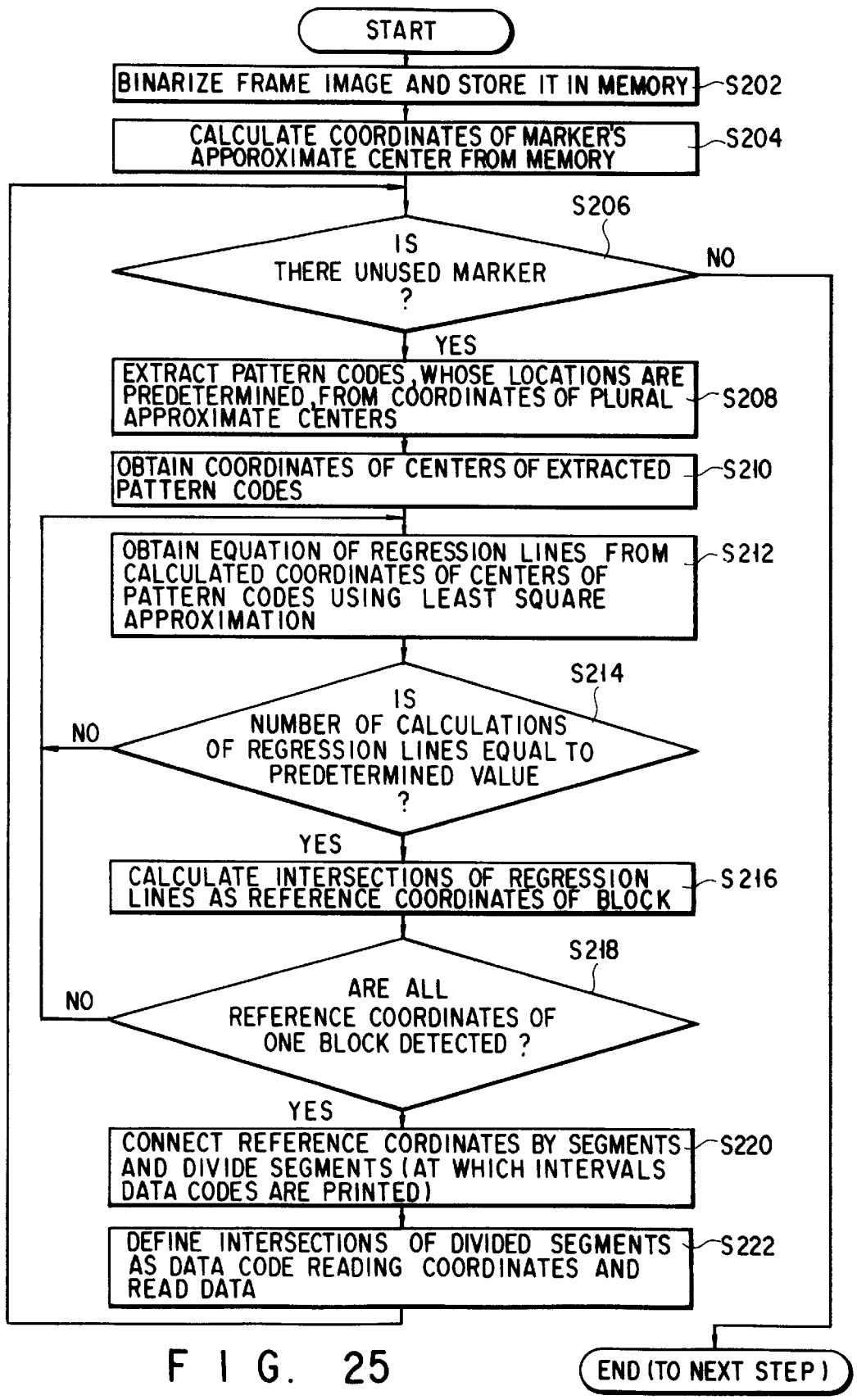
F I G. 25

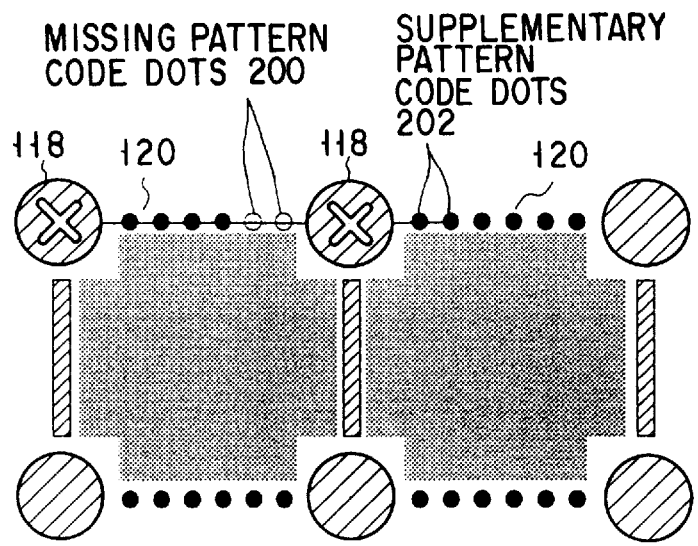
F I G. 31
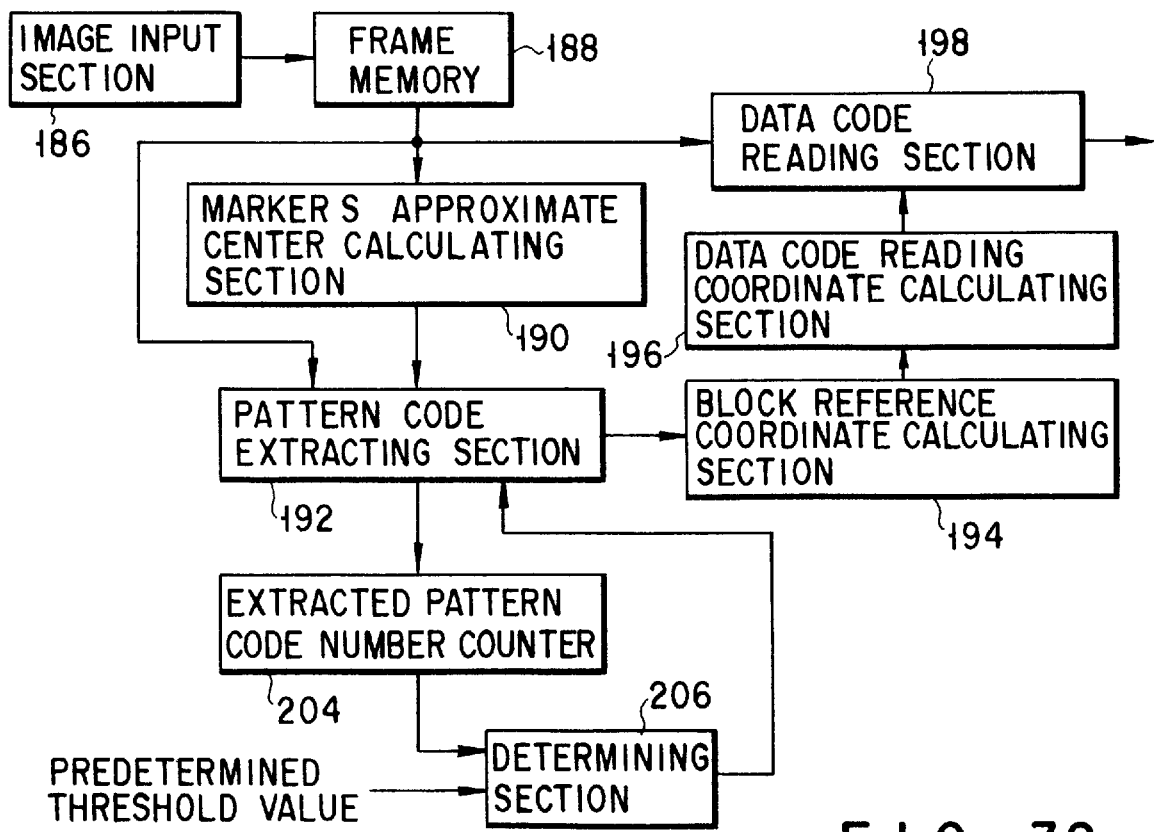
F I G. 32

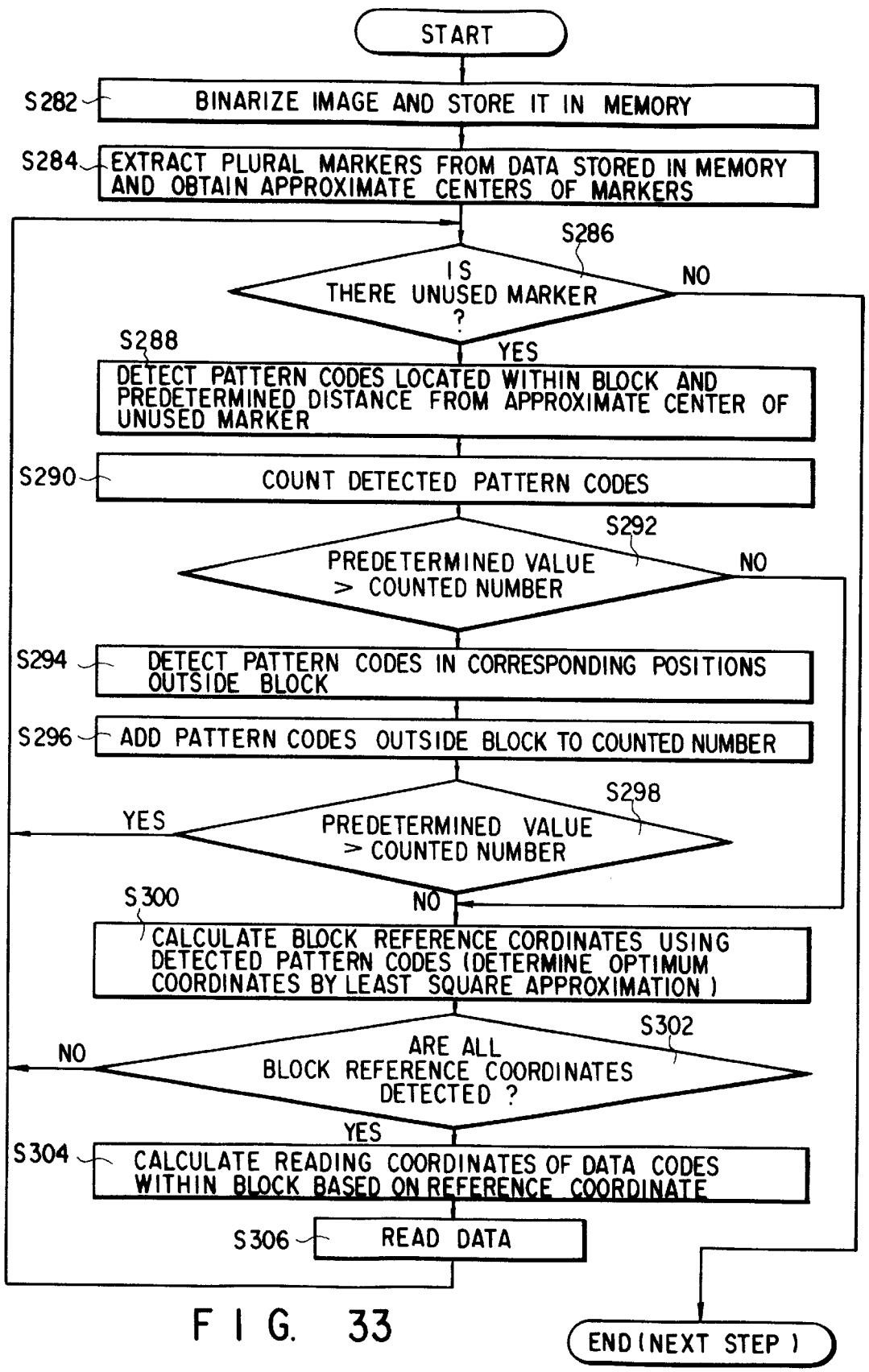
F I G. 33

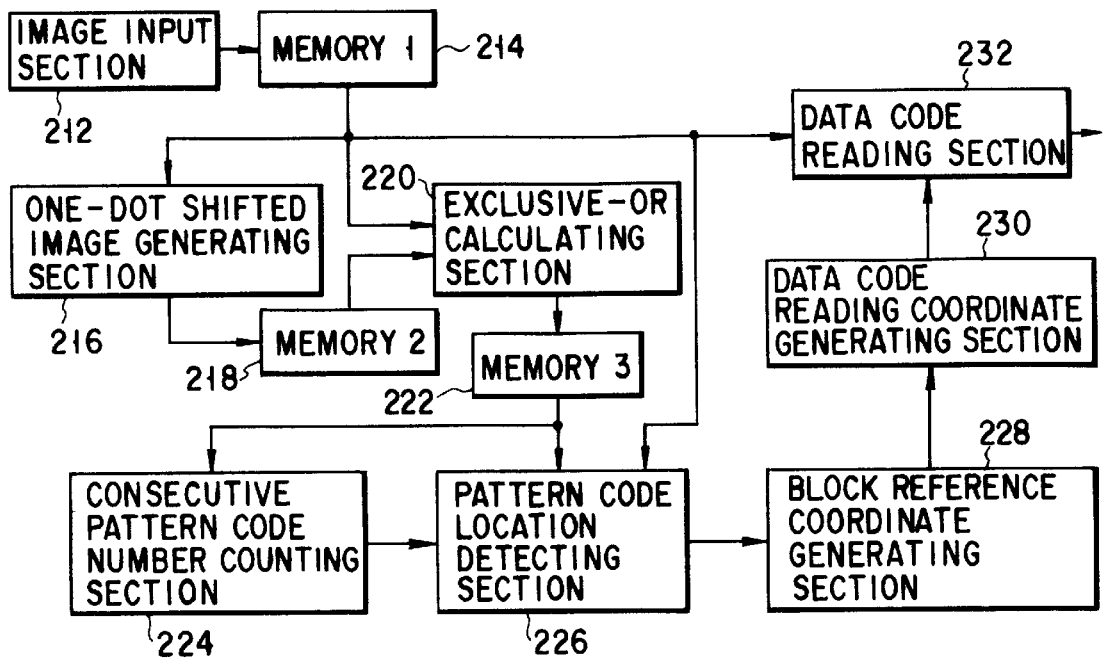
F I G. 35
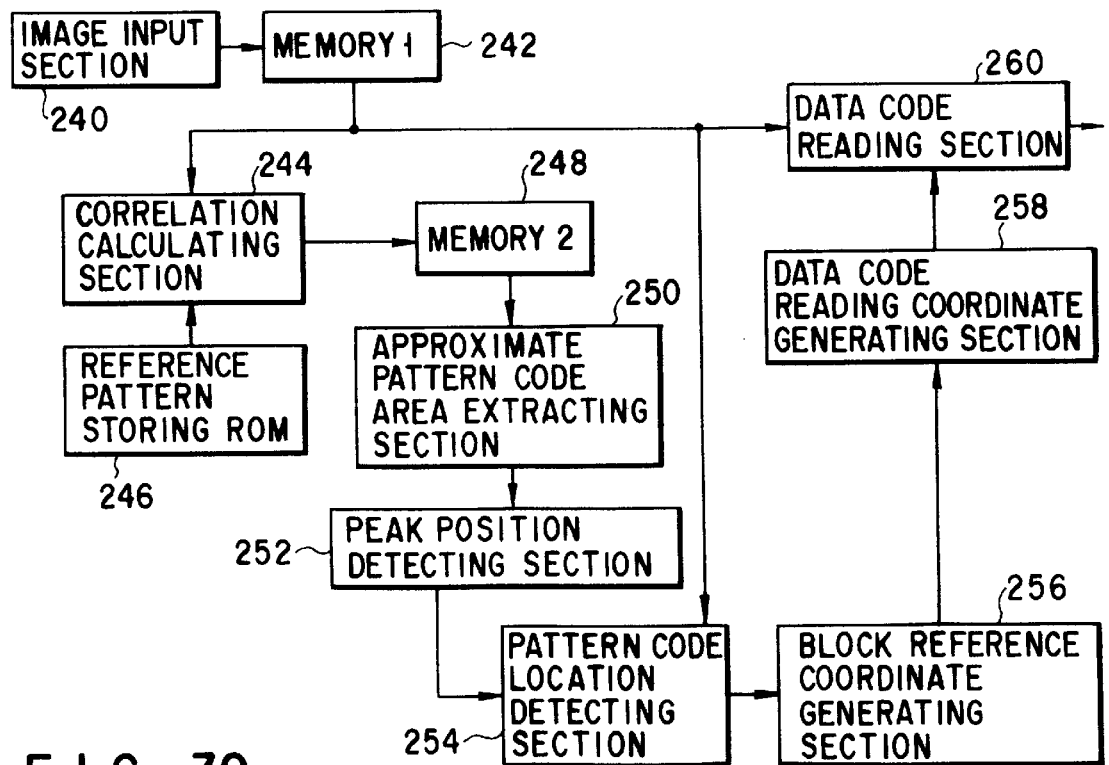
F I G. 39

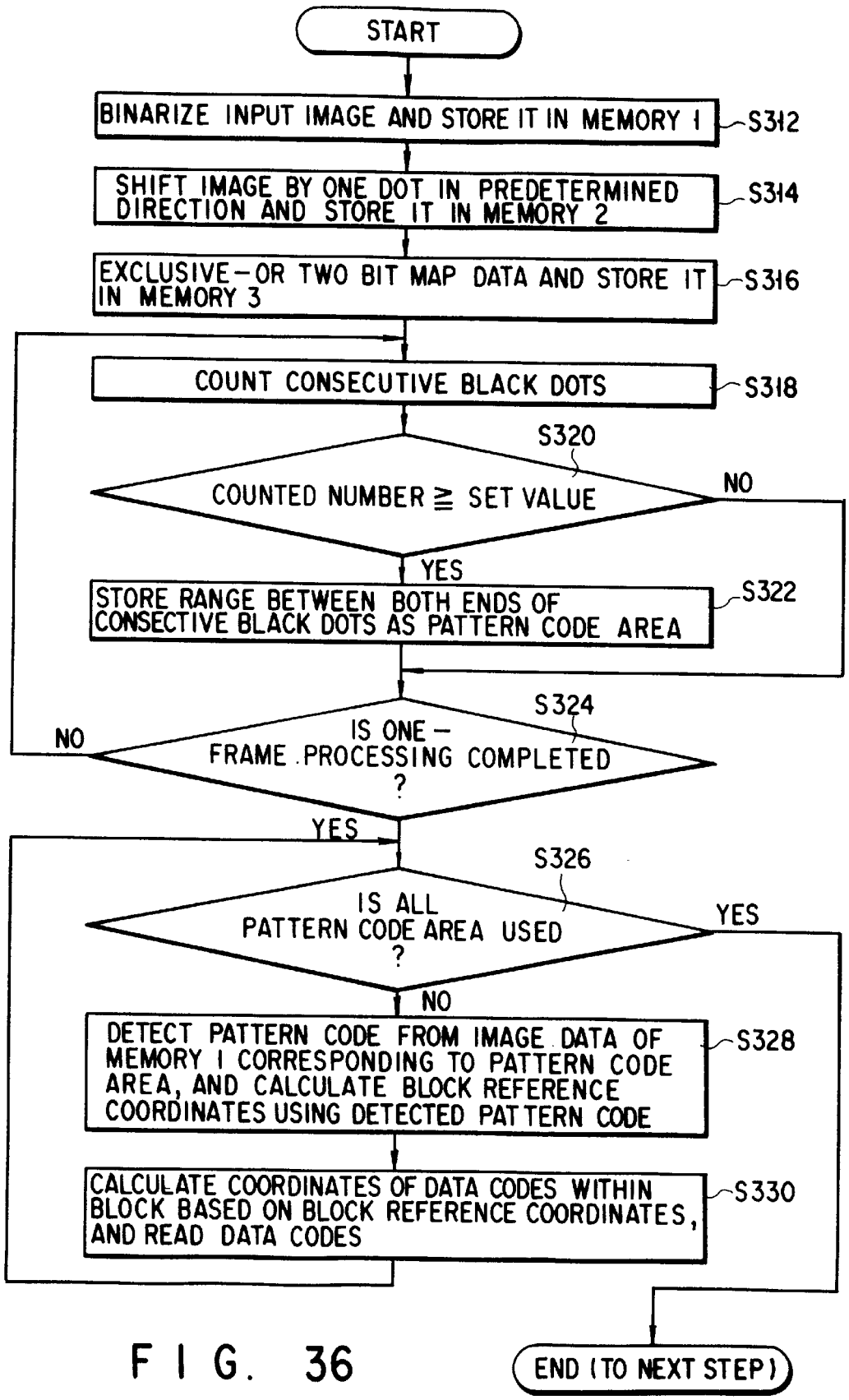
F I G. 36

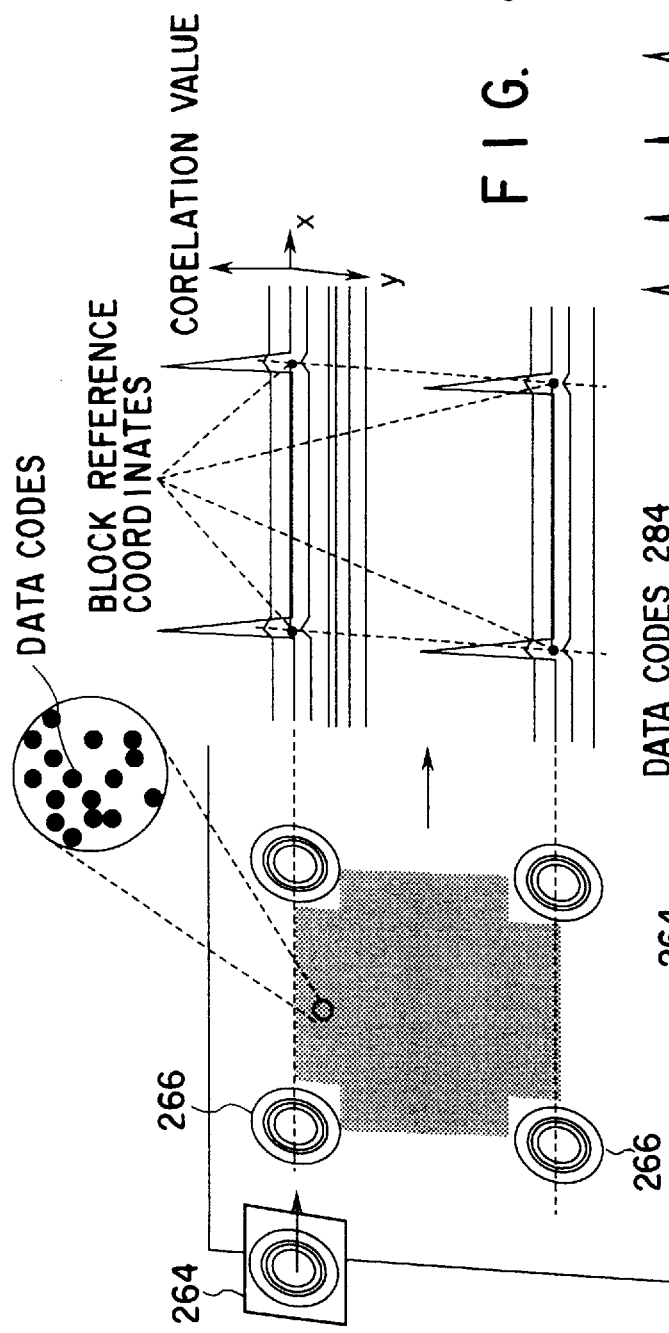
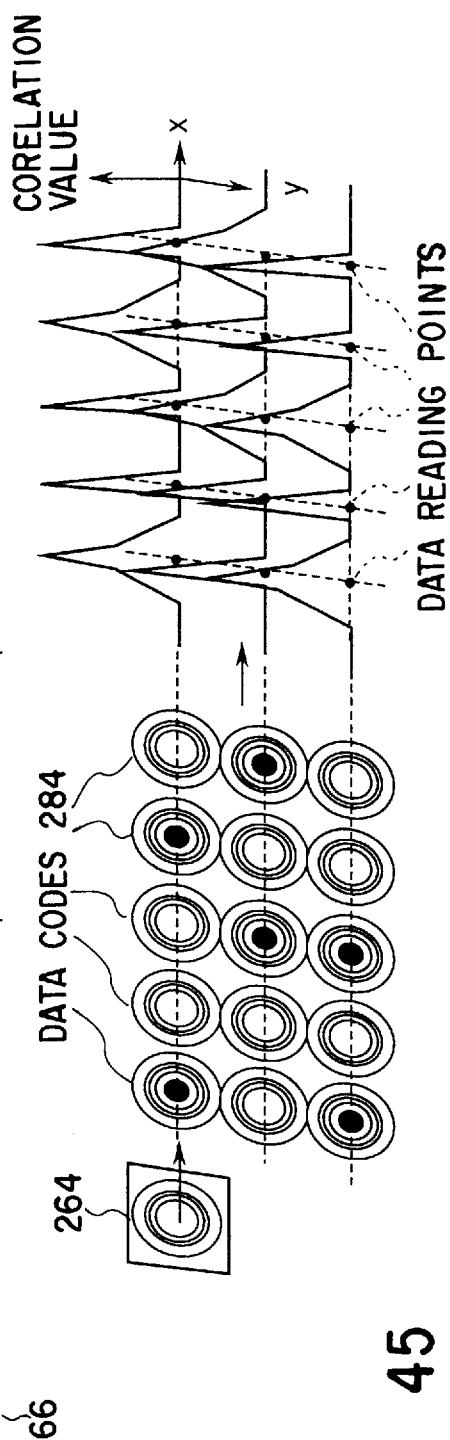
F I G. 42
F I G. 45

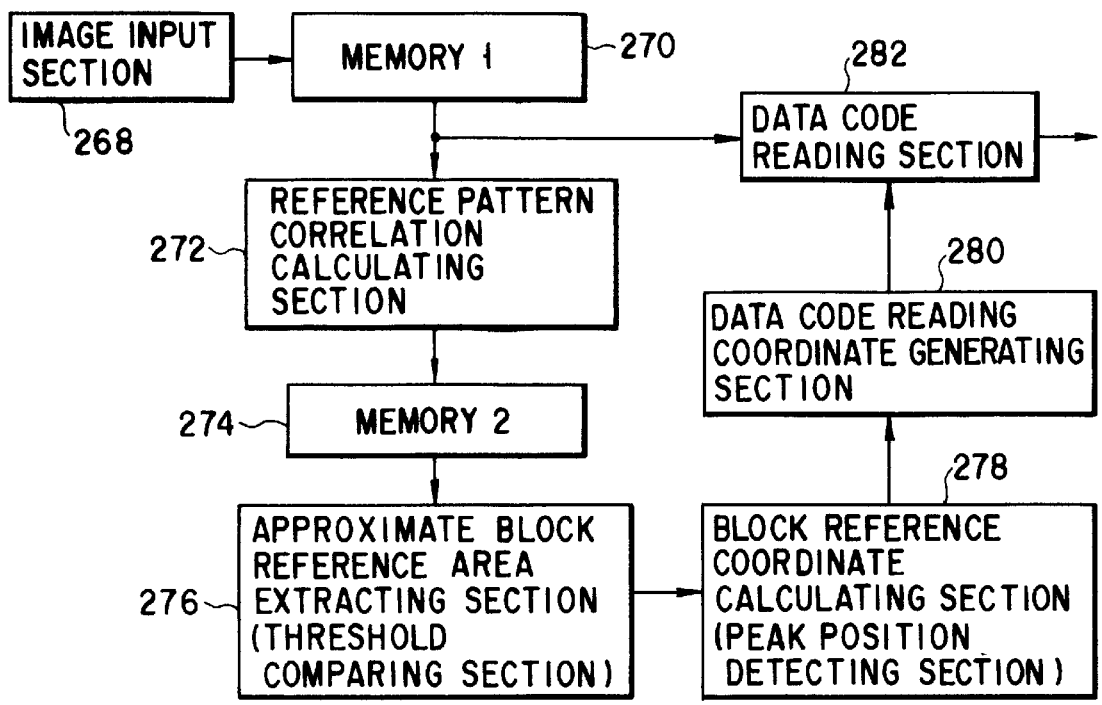
F I G. 43
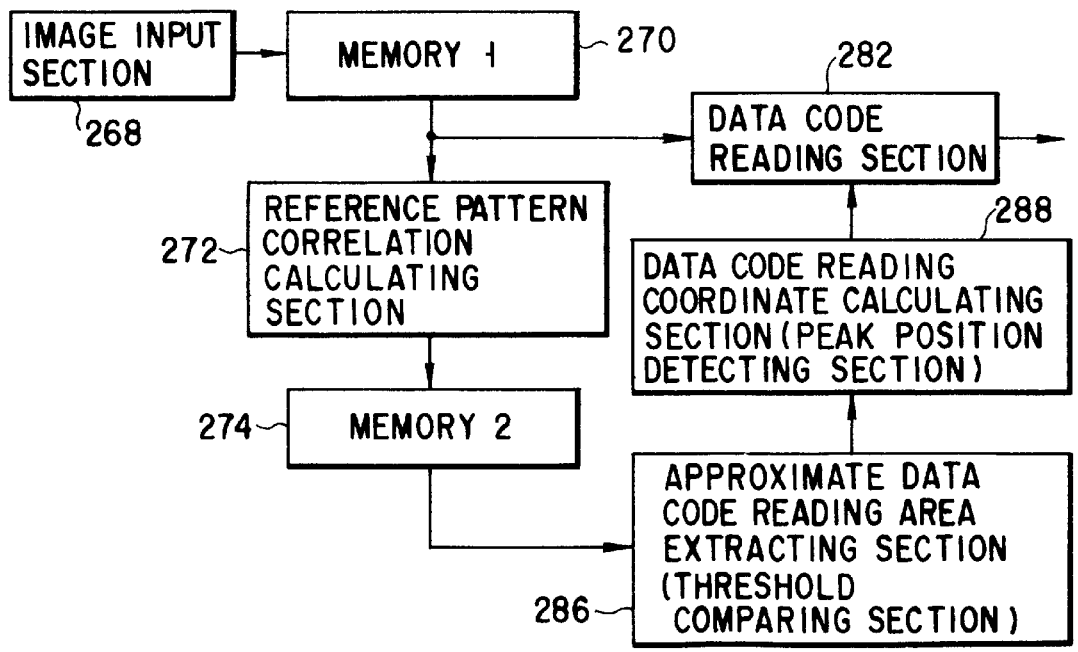
F I G. 46

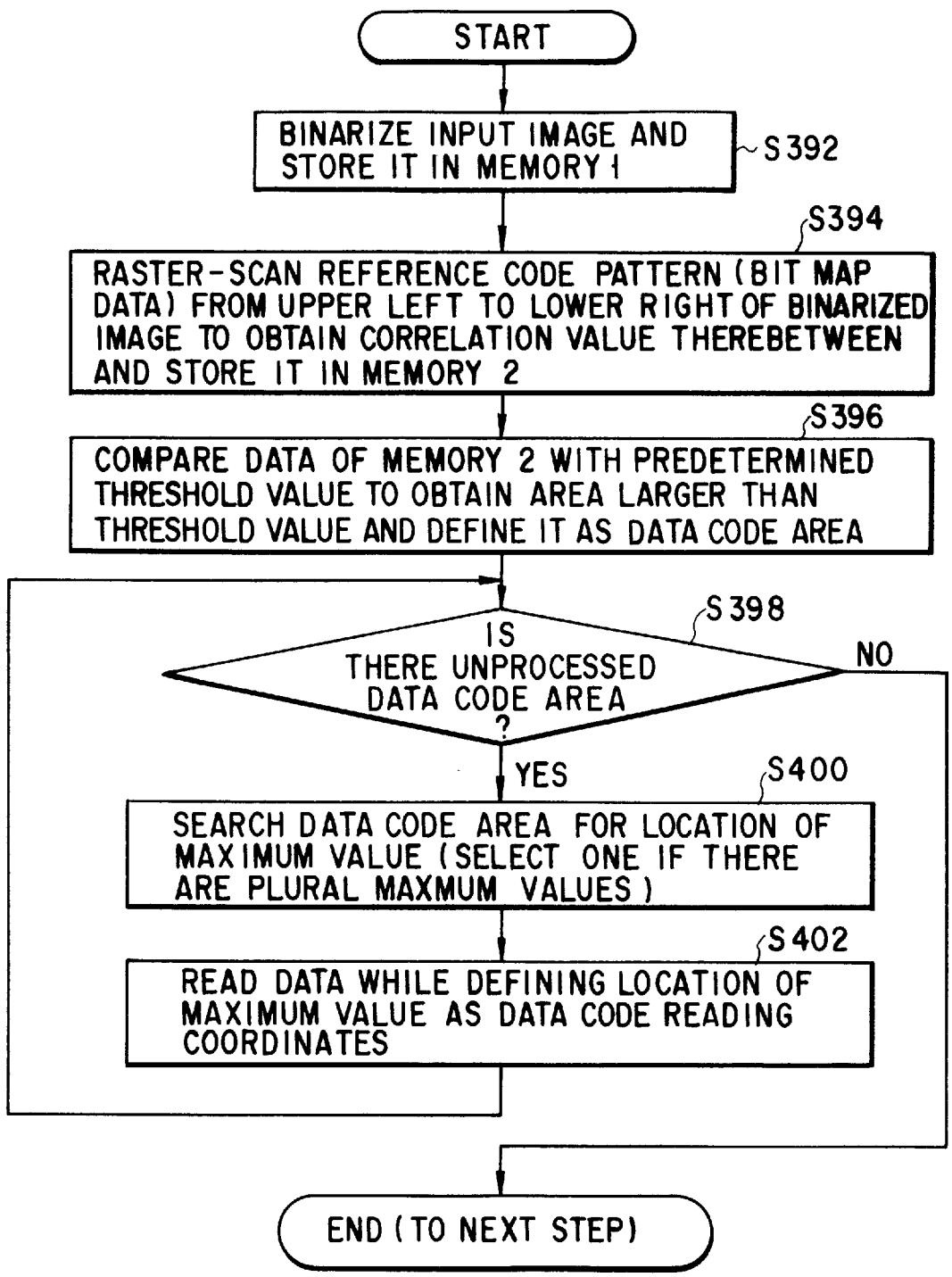
F I G. 47

INFORMATION RECORDING MEDIUM, TWO-DIMENSIONAL CODE, INFORMATION REPRODUCTION SYSTEM AND INFORMATION REPRODUCTION METHOD

BACKGROUND OF THE INVENTION

1. Field of the Invention

The present invention relates to an information recording medium such as paper on which multimedia information including audio information of voice, music, etc., video information obtained from cameras, video equipment, etc., digital code data obtained from personal computers, wordprocessors, etc. is recorded as a two-dimensional code pattern which can be optically read, a two-dimensional code of the information recording medium, and a system and a method for optically reading the two-dimensional code pattern recorded on the information recording medium and reproducing the original multimedia information.

2. Description of the Related Art

Various recording mediums, such as magnetic tapes and optical disks, have been conventionally known as those for recording voice information, music information, etc. However, even though their reproductions are mass-produced, they increase in unit cost and require a very large space for keeping themselves. Furthermore, it takes time and trouble to transfer a recording medium on which voice information is recorded from one person to another far away therefrom, even though it is mailed or sent by hand. These problems are true of all the so-called multimedia information including video information obtained from cameras, video equipment, etc., digital code data obtained from personal computers, wordprocessors, etc., as well as audio information.

International Publication No. WO 94/08314 (corresponding to U.S. patent application Ser. No. 08/407,018) discloses a system capable of dealing with the above problems. According to this system, multimedia information containing at least one of audio information, video information and digital code data is recorded on an information recording medium, such as paper, in the form of a two-dimensional code formed by two-dimensionally arranging a plurality of dots, i.e., image information or encoded information which can be facsimiled and mass-produced at low cost, and it is reproduced therefrom.

In the system of the international publication, two-dimensional codes are optically read by holding an information reproduction apparatus and manually scanning the recording medium along the two-dimensional codes.

The structure of a two-dimensional code pattern is still being studied so as to improve in recording density. If higher density recording is achieved, the locations of respective dots of the two-dimensional code pattern have to be calculated with high precision. However, such high-precision calculation is not particularly taken into consideration by the above International Publication.

Jpn. Pat. Appln. KOKAI Publication No. 60-165503 discloses a method of reading information with high precision using a considerably large reference image. This method can be applied to a two-dimensional code as disclosed in the International Publication. If it is so, the following problem however will arise.

Assume that a marker is a circle with radius r composed of s dots, the size of a code to be read is a×b dots, and the size of one frame is c×d dots. If the real coordinates of the code is (i, j), the maximum tolerance for reading the code is (1±a/2, j±b/2). To keep effective precision, therefore, $n_x$ figures obtained by adding the number of figures indicating ±a/2 to those (c dots) indicating the X coordinate, are needed along the X-axis, and $n_y$ figures obtained by adding the number of figures representing ±b/2 to those (d dots) representing the Y coordinate, are done along the Y-axis. A larger one of $n_x$ and $n_y$ is therefore required on the whole.

For example, if the size of a code to be read is 3.4×3.4 dots and that of one frame is 500×500 dots, $n_x$ and $N_y$ are each five figures since three figures are required for defining the coordinates and two decimal places are required for representing an error. If the coordinates of s dots constituting the marker are $(x_i, y_i)$ (i=1 to s), its centroid $(g_x, g_y)$ is expressed as follows:

$$g_x = \frac{1}{s} \sum_{i=1,s} x_i \quad g_y = \frac{1}{s} \sum_{i=1,s} y_i$$

Therefore, the s dots have to be larger than a number in $n_x$ or $n_y$ figures. When the marker includes five figures dots (=ten thousand dots or more), the centroid of the marker can be detected. Since, in this case, $\pi r^2 > 10000$, the radius r of the marker is 57 dots or more. This marker, which is illustrated in FIG. 1, is very large and thus the recording density is remarkably decreased.

SUMMARY OF THE INVENTION

An object of the present invention is to provide an information recording medium, a two-dimensional code, an information reproduction system and an information reproduction method, each capable of accurately calculating the locations of respective dots of a code pattern recorded with high density.

According to a first aspect of the present invention, there is provided an information recording medium comprising:

a sheet-shaped member; and a two-dimensional code recorded on the sheet-shaped member and including a plurality of dots formed two-dimensionally, at least two of the plurality of dots being arranged so as to have a preset positional relationship therebetween.

According to a second aspect of the present invention, there is provided a two-dimensional code comprising:

a plurality of dots arranged two-dimensionally; and at least two dots of the plurality of dots arranged so as to have a preset positional relationship therebetween.

According to a third aspect of the present invention, there is provided an information reproduction system for reproducing a two-dimensional code optically readable and recorded with high density, comprising:

input means for optically picking up an image of an information recording medium including a two-dimensional code and inputting the two-dimensional code as a video signal, the two-dimensional code having a plurality of dots arranged twodimensionally based on a format representing a preset positional relationship;

position information calculating means for calculating position information from the two-dimensional code input as the video signal by the input means;

format storing means for storing the format; and coordinate calculating means for calculating position coordinates of each of the plurality of dots of the two-dimensional code from both the position information calculated by the position information calculating means and the preset positional relationship of the format stored in the format storing means.

According to a fourth aspect of the present invention, there is provided a method of reproducing a two-dimensional code including a plurality of dots optically readable and recorded with high density, comprising the steps of:

setting a provisional reference point within the two-dimensional code having at least two dots arranged and recorded so as to have a preset positional relationship;

obtaining an ideal point corresponding to the at least two dots based on both the provisional point and the preset positional relationship;

correcting a position of the provisional point such that a difference between the ideal point and an actual point corresponding to the at least two dots is minimized and setting a real reference point for reading the at least two dots and other dots; and reproducing information based on the real reference point.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3A is a view showing a format of two-dimensional codes;

FIG. 3B is a view of a marker;

FIG. 3C is a view for explaining the streak processing;

FIG. 4 is a flowchart of reading coordinates calculation in the information reproduction system shown in FIG. 2;

FIG. 17 is a view showing a format of deblocked two-dimensional pattern codes;

FIG. 18 is a view showing an example of multiple recording of pattern codes;

FIG. 19 is a view showing an example of special printing of markers;

FIGS. 21A to 21C are views each illustrating another example of the arrangement of pattern codes;

FIG. 22A is a view depicting a two-dimensional code pattern including no pattern codes;

FIG. 22B is a view depicting a picked-up image of the two-dimensional code pattern shown in FIG. 22A within one frame;

FIG. 23 is a block diagram showing an example of an information reproduction system using rectangle fitting;

FIG. 24 is a block diagram showing another example of the information reproduction system using rectangle fitting;

FIG. 25 is a flowchart of data reading processing for one frame in the system shown in FIG. 24;

FIG. 26 is a block diagram showing still another example of the information reproduction system using rectangle fitting;

FIG. 31 is a view for explaining an example of calculating the real center of a marker using pattern code dots near to missing pattern code dots;

FIG. 32 is a block diagram of the constitution of an information reproduction system in the example shown in FIG. 31;

FIG. 33 is a flowchart of data reading processing for one frame in the system shown in FIG. 32;

FIG. 35 is a block diagram of the constitution of an information reproduction system in the example shown in FIG. 34;

FIG. 36 is a flowchart of data reading processing in the system shown in FIG. 35;

FIG. 39 is a block diagram of the constitution of an information reproduction system in the example shown in FIG. 37;

FIG. 42 is a view of a two-dimensional code pattern having pattern codes of ring-shaped Barker codes;

FIG. 43 is a block diagram of the constitution of an information reproduction system in the example shown in FIG. 42;

FIG. 45 is a view illustrating a two-dimensional code pattern in which a ring-shaped Barker code corresponds to each dot of data codes;

FIG. 46 is a block diagram of the constitution of an information reproduction system in the example shown in FIG. 45; and FIG. 47 is a flowchart of data reading processing in the system shown in FIG. 46.

DETAILED DESCRIPTION OF THE PREFERRED EMBODIMENTS

Embodiments of the present invention will now be described with reference to the accompanying drawings.

Figure 1:
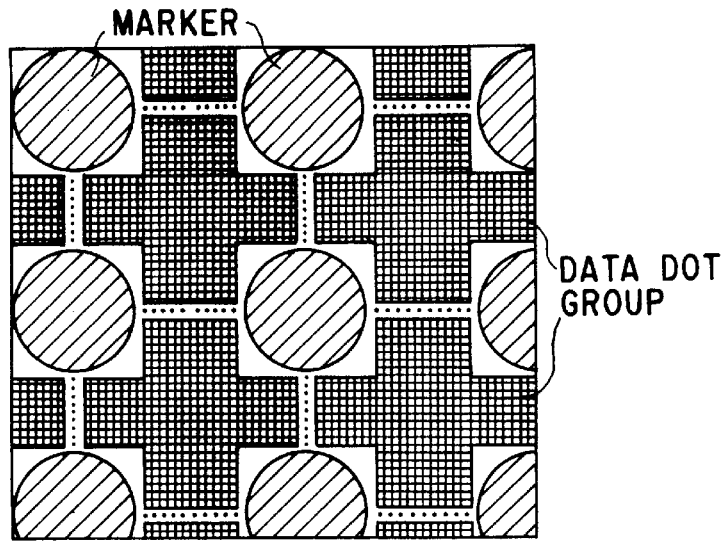
FIG. 1 is a view showing a format of two-dimensional codes which are to be read with high precision using a prior art method.
Figure 2:
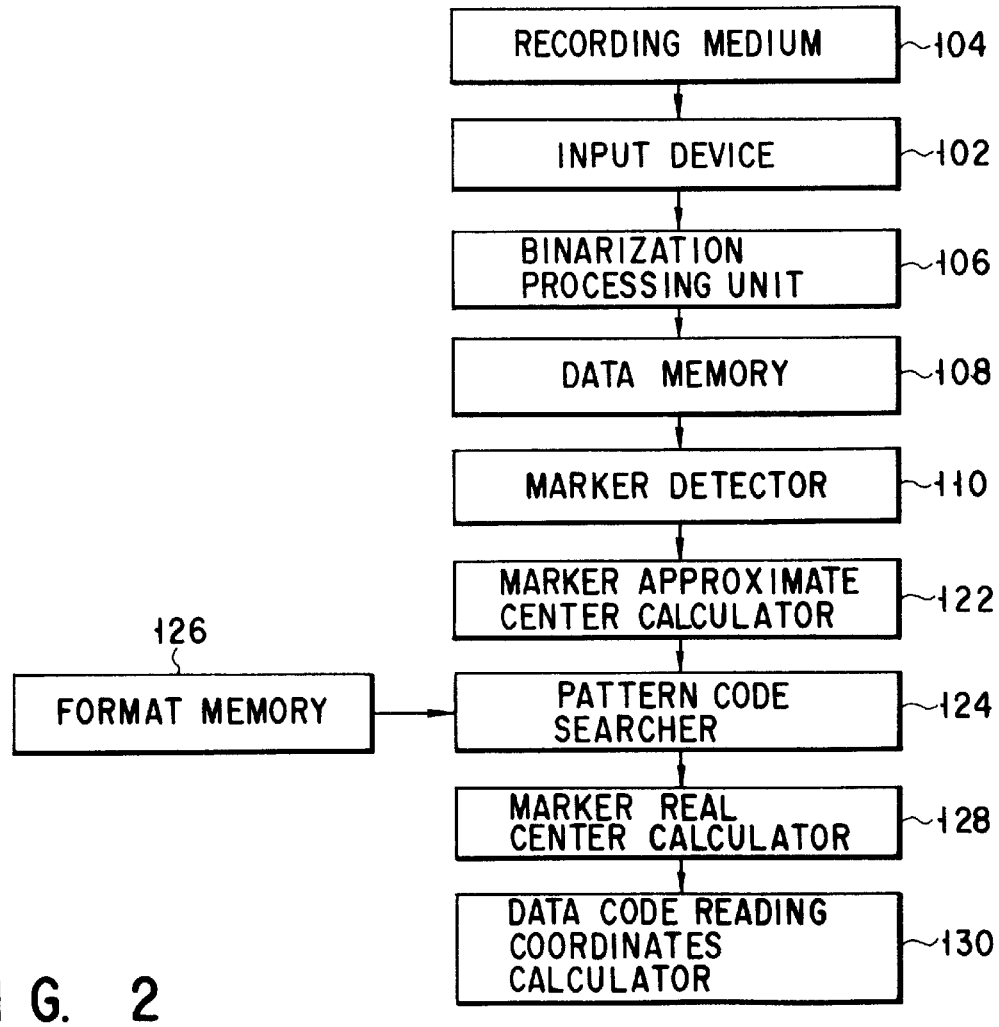
FIG. 2 is a block diagram showing the structure of an information reproduction system according to an embodiment of the present invention.

FIG. 2 is a block diagram depicting the structure of an information reproduction system according to an embodiment of the present invention. In FIG. 2, an input device 102 picks up an image of a recording medium 104 on which a two-dimensional code is recorded to acquire image data of the two-dimensional code. A binarization processing unit 106 binarizes the image data and causes it to be stored in a data memory (frame memory) 108. A marker detector 110 detects a marker using the image data stored in the data memory 108.

The two-dimensional code recorded on the recording medium 104 includes, as shown in FIG. 3A, a group of blocks 112 arranged in matrix. Each of the blocks 112 comprises a data code area 114 including a data code pattern having a plurality of dots (data dot group) arranged in accordance with the contents of data, and a block address pattern (address code) 116 formed in a predetermined position relative to the data code area 114 and including a plurality of dots (address dot groups) indicating the address of the block. Each block 12 also includes markers 118 arranged at predetermined locations, e.g., at four corners thereof, and a pattern code 120 having a plurality of dots (pattern matching dot groups) formed in a predetermined position, e.g., between adjacent markers in a first direction. The address code 116 is formed in a predetermined position relative to the markers 118, e.g., between adjacent markers in a second direction. The address and pattern codes 116 and 120 and data codes (data dot groups), not shown, arranged within the data code area 114 are constituted of dots of the same size. Each of the markers 118 is formed as a round dot which is larger than each of these dots, and the large round dot has a diameter of seven dots and is recorded on the recording medium as shown in FIG. 3B.

The marker detector 110 detects the markers 118. A marker approximate center calculator 122 calculates the approximate center, i.e., the approximate coordinates of a detected one of the markers 118. Using the approximate center as a provisional reference point, a pattern code searching section 124 searches the pattern code 120 in accordance with format information of the two-dimensional code stored in a format memory 126, that is, preset positional information thereof. A marker real center calculator 128 calculates the real center, that is, the very accurate coordinates (real reference point) from both the coordinates (actual points) of the searched pattern code and the idealistic points extracted from the format information, using the error minimizing method. A data code reading coordinates calculator 130 calculates reading coordinates for reading the respective dots, i.e., the data dots of the address code 116 and data code area 114 from the data memory 108, on the basis of the calculated real center (real reference point) of the marker 118.

After the above processing, data is read out in accordance with the reading coordinates, and the operations of demodulation, deinterleave, error correction/detection, etc., as disclosed in International Publication No. WO 94/08314, are performed, with the result that the original multimedia information is reproduced.

The reading coordinates calculation of the information reproduction system having the above constitution will now be described.

Now assume that an image of the two-dimensional code recorded on the recording medium 104 is picked up by the input device 102 and the picked-up image is binarized and stored in the data memory 108. First, the marker detector 110 executes a marker detection processing using the image stored in the memory 108. In other words, as illustrated in FIG. 4, a streak processing (step S102), a horizontal threshold processing (step S104), and a vertical threshold processing (step S106) are performed in this order to detect a marker.

The streak processing will be described briefly, though it is a well-known technique. In a two-dimensional code pattern as shown in FIG. 3A, the streak processing is to scan the pattern in the horizontal direction for a black dot and count the number of black dots continuing from the coordinates thereof. For example, in the marker shown in FIG. 3B, in the first row (R1), five black dots continue from the third column (C3) to the seventh one (C7). If, therefore, the streak processing is executed, the number "5" corresponding to the coordinates (R1, C3) is set in a work memory (not shown) for temporarily storing the results of the streak processing, as shown in FIG. 3C. (Actually, the work memory stores both coordinates data "R1, C3" and length data "5") Then the counted coordinates are skipped (data "0" is input), and the same processing is executed from the next coordinates. Consequently, data "005000000" input to the first row (R1). If the same processing is done, data "070000000" is done to the second row (R2). Finally, the results shown in FIG. 3C are obtained.

The results so obtained undergoes the horizontal threshold processing. For example, using "6" as a threshold value, the value "5" in the coordinates (R1, C3) and (R7, C3) in FIG. 3C is deleted, and only the value "7" in the second column (C2) of each of the second (R2) to sixth (R6) rows remains.

Thus, an image of the value "7" is reformed and seven black dots are stored in the work memory.

After that, the streak processing is executed in the vertical direction and so is the threshold processing, as in the case of those in the horizontal direction.

Figure 5B:
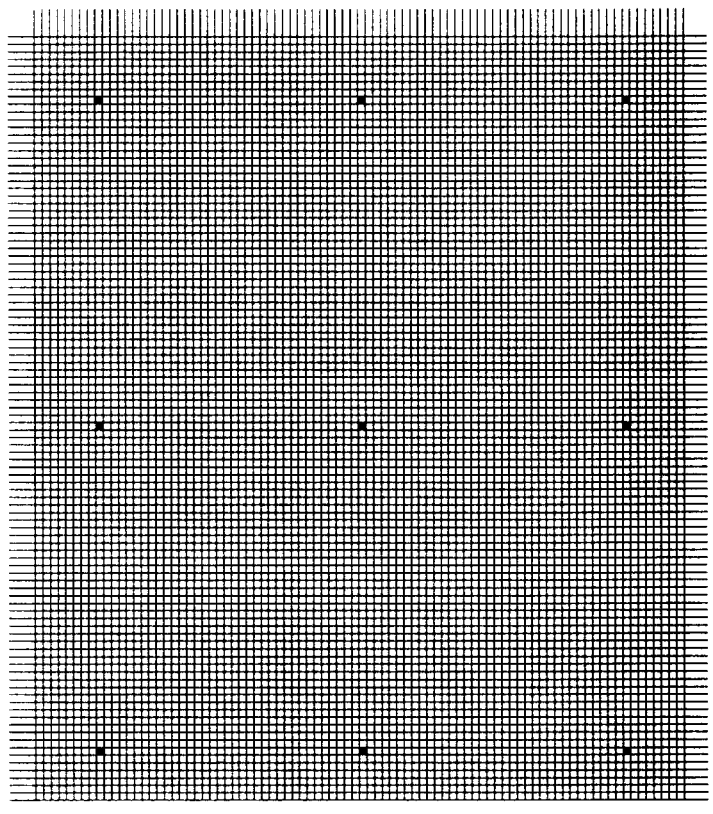
FIG. 5B is a diagram showing the approximate centers of the markers calculated by a marker approximate center calculator.
Figure 5A:
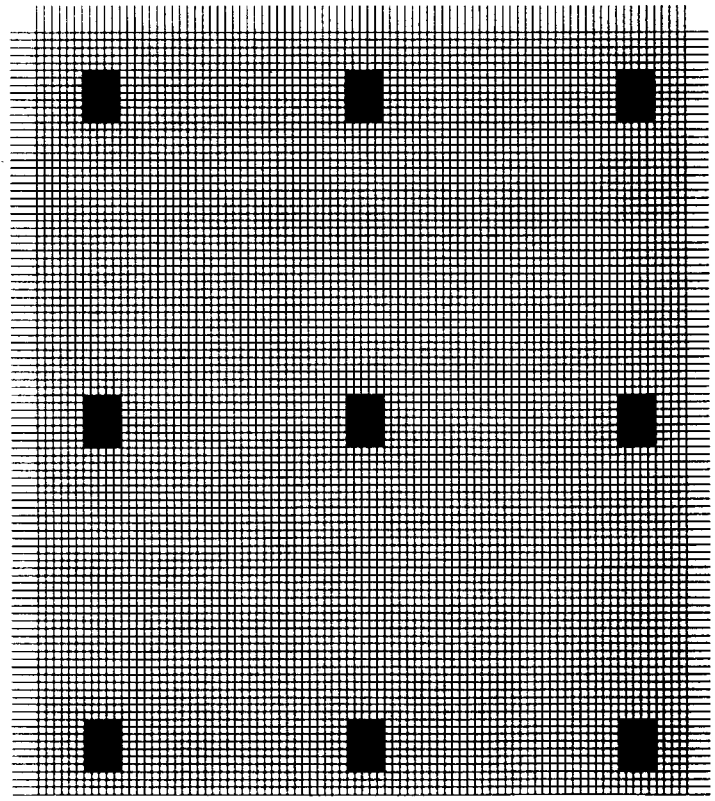
FIG. 5A is a diagram of an image which has undergone the threshold processing in the horizontal and vertical directions.

If the threshold processing is completed in both the horizontal and vertical directions, an image of the marker is re-formed so as to have a circle whose upper and lower portions are missing, as shown in FIG. 5A. Moreover, a number of dot patterns (which may have consecutive black dots) included in the pattern code 120 and data code area 114 can be all canceled by the threshold processing described above.

When each marker 118 is detected through the foregoing process, the marker approximate center calculator 122 calculates the centroid of the marker by the known method (step S108). Hereinafter the calculated centroid is called "approximate center." Thus, as illustrate in FIG. 5B, the approximate center of each marker 118 is obtained.

The processing of searching a pattern code 120, which is provided in a predetermined position relative to the approximate center (provisional reference point) of a marker 118, by the pattern code searching section 124, will now be described.

First adjacent markers 118 are searched (step S110), and then a processing for virtually coupling these markers is performed (step S112). In other words, a rectangular block 112 is obtained by coupling the approximate centers of the respective markers 118 in the horizontal and vertical directions. Since information indicative of how far the pattern code 120 is separated from the centers of the markers 118, is previously stored in the format memory 126 as format information (design value), the location (idealistic point) of the pattern code 120 is estimated based on the format information (step S114). The pattern code 120 is searched using the real code stored in the data memory 108 (step S116).

More specifically, in step S114, it is estimated that the pattern code is located in, e.g., coordinates (10, 10). In some cases, however, the actual pattern code 120 is shifted from the estimated coordinates; therefore, in step S116, the upper one pixel and the lower one pixel of the estimated coordinates are searched for the actual pattern code 120.

The pattern code so detected is considered to be the real pattern code 120, and its centroid (actual point) is calculated by the well-known method (step S118).

If the pattern code 120 is detected by the foregoing pattern code searching processing, the marker real center calculator 128 calculates the real center, i.e., the accurate central coordinates of each marker 118, using an error minimizing method which will be described in detail later. The processing for calculating the real center of the marker contains an error minimization processing (step S120) and a marker center calculation processing (step S122).

Using the real center of the marker 118 as a coordinates calculating reference point (real reference point) for reading the data code, the data code reading coordinates calculator 130 calculates reading coordinates (absolute coordinates) for reading the address code 116 and the data codes within the data code area 114 (step S124), thus completing the reading coordinates calculation processing. After that, the data codes within the data code area 114 are read in sequence on the basis of the reading coordinates, and the read codes are demodulated and then output from a predetermined output device (not shown).

The error minimizing method will now be described hereinafter.

Figure 6:
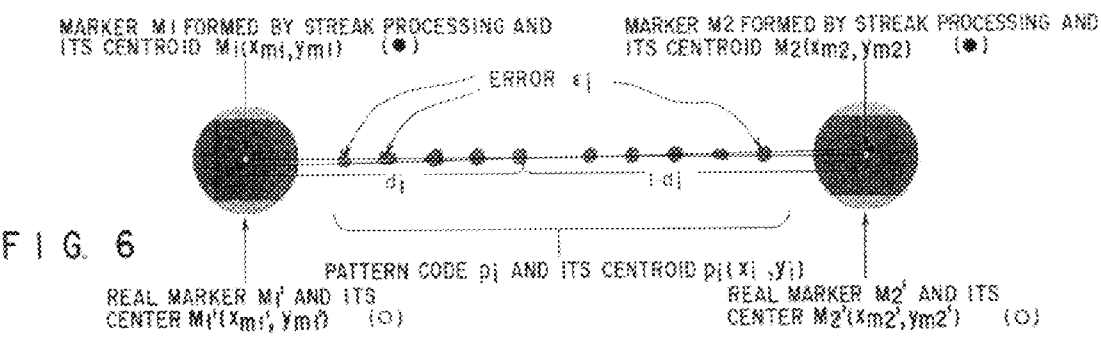
FIG. 6 is a view for explaining the vector fitting.

As one error minimizing method, the vector fitting will be first described, with reference to FIG. 6. This method aims at obtaining the real centers of two markers 118 at the same time.

In FIG. 6, the leftmost and rightmost correct circles (indicated by thin and thick meshes) are defined as real markers. The leftmost and rightmost markers are represented by $M_1'$ and $M_2'$, respectively, and their centers (real centers), which are indicated by white spots, are expressed by $M_1'(x_{m1}', y_{m1}')$ and $M_2(x_{m2}', y_{m2}')$, respectively. The apostrophe (') is a target real center.

On the other hand, incomplete circles or markers (indicated by thick meshes) are those directly obtained by the streak processing, i.e., from an image. The leftmost and rightmost markers are expressed as $M_1$ and $M_2$, respectively, and their centroids (approximate centers), which are indicated by black spots, are expressed as $M_1(x_{m1}, y_{m1})$ and $M_2(x_{m2}, y_{m2})$, respectively.

The coordinates of these approximate centers are provided as information, and the real centers of the markers can be obtained from the information using the error minimizing method.

Referring to FIG. 6, for example, 10 dots, which are called a pattern code or a group of pattern matching dots $p_i$ (i=1–10), are formed between the markers. In other words, the pattern code is constituted of pattern matching dots $p_1$ to $P_{10}$ arranged in predetermined positions.

To detect the pattern code between two markers $M_1$ and $M_2$, the two centroids (approximate centers), i.e., the two black spots are connected by a straight line, and then information that one dot of the pattern code is present at which point the line is divided into two based on format information, is obtained. The straight line is divided into one line with a length of $d_i$ and another with that of $(1-d_i)$.

By dividing the line including both the centroids (provisional reference points) in the ratio of $d_i$ to $(1-d_i)$, the coordinates (idealistic points) where a pattern code is to be present, that is, the centroids $p_i'(x_i', y_i')$ can be estimated. The real pattern code pi is detected by searching the vicinity of the estimated coordinates, and its centroid $p_i(x_i, y_i)$ is calculated. Since the calculation of the centroid $p_i(x_i, y_i)$ can be performed by the well-known method, its description is omitted.

The estimated pattern code's centroid $p_i'(x_i', y_i')$ is expressed by centers $M_1'(x_{m1}', y_{m1}')$ and $M_2'(x_{m2}', y_{m2}')$ of two real markers $M_1'$ and $M_2'$, as follows:

$$\begin{cases} x_i' = x_{m1}' + (x_{m1}' - x_{m2}')d_i = (1-d_i)x_{m1}' + d_i x_{m2}' \\ y_i' = y_{m1}' + (y_{m1}' - y_{m2}')d_i = (1-d_i)y_{m1}' + d_i y_{m2}' \end{cases}$$

The above equations indicate design values which can easily be expressed.

Here a difference in distance between the estimated centroid $p_i'(x_i', y_i')$ and the actual centroid $p_i(x_i, y_i)$ is represented by error $\epsilon_i$. This error, which corresponds to a distance between two straight lines, is caused at each dot because of the difference between the estimated and actual centroids. Therefore, the correct center coordinates (real center) can be estimated by minimizing the error $\epsilon_i$.

The total sum of errors $\epsilon_i$, which is obtained by squaring the distances at the respective dots and adding all the squared distances, is provided as an evaluation function E to be minimized. This function is expressed as follows.

$$E = \sum_{i=1}^{n} \epsilon_i^2 = \sum_{i=1}^{n} \{(x_i' - x_i)^2 + (y_i^1 - y_i)^2\}$$

$$= \sum_{i=1}^{n} [\{(1-d_i)x_{m1}' + d_i x_{m2}' - x_i\}^2 + \{(1-d_i)y_{m1}' + d_i y_{m2}' - y_i\}^2]$$

Since the above-expressed evaluation function E has only to be minimized, the function E is partially differentiated by $x_{m1}'$ and $x_{m2}'$ as follows.

$$\frac{\partial E}{\partial x_{m1}'} = \sum_{i=1}^{n} 2\{(1-d_i)x_{m1}' + d_i x_{m2}' - x_i\}(1-d_i) = 0 \rightarrow$$

$$x_{m1}' \sum_{i=1}^{n} (1-d_i)^2 + x_{m2}' \sum_{i=1}^{n} (1-d_i)d_i - \sum_{i=1}^{n} (1-d_i)x_i = 0$$

$$\frac{\partial E}{\partial x_{m2}'} = \sum_{i=1}^{n} 2\{(1-d_i)x_{m1}' + d_i x_{m2}' - x_i\}d_i = 0 \rightarrow$$

$$x_{m1}' \sum_{i=1}^{n} (1-d_i)d_i + x_{m2}' \sum_{i=1}^{n} d_i^2 - \sum_{i=1}^{n} d_i x_i = 0$$

By solving the above simultaneous equations, the following are obtained.

$$x_{m1}' = \frac{\sum_{i=1}^{n} d_i^2 \sum_{i=1}^{n} (1-d_i)x_i - \sum_{i=1}^{n} (1-d_i)d_i \sum_{i=1}^{n} d_i x_i}{\sum_{i=1}^{n} d_i^2 \sum_{i=1}^{n} (1-d_i)^2 - \sum_{i=1}^{n} (1-d_i)d_i \sum_{i=1}^{n} (1-d_i)d_i}$$

$$x_{m2}' = \frac{\sum_{i=1}^{n} (1-d_i)^2 \sum_{i=1}^{n} d_i x_i - \sum_{i=1}^{n} (1-d_i)d_i \sum_{i=1}^{n} (1-d_i)x_i}{\sum_{i=1}^{n} d_i^2 \sum_{i=1}^{n} (1-d_i)^2 - \sum_{i=1}^{n} (1-d_i)d_i \sum_{i=1}^{n} (1-d_i)d_i}$$

Thus, the x-coordinate (abscissa) of the center of each of the real markers $M_1'$ and $M_2'$ is determined.

Similarly, if the evaluation function E is partially differentiated by $y_{m1}'$ and $y_{m2}'$, the following equations are obtained.

$$y_{m1}' = \frac{\sum_{i=1}^{n} d_i^2 \sum_{i=1}^{n} (1-d_i)y_i - \sum_{i=1}^{n} (1-d_i)d_i \sum_{i=1}^{n} d_i y_i}{\sum_{i=1}^{n} d_i^2 \sum_{i=1}^{n} (1-d_i)^2 - \sum_{i=1}^{n} (1-d_i)d_i \sum_{i=1}^{n} (1-d_i)d_i}$$

$$y_{m2}' = \frac{\sum_{i=1}^{n} (1-d_i)^2 \sum_{i=1}^{n} d_i y_i - \sum_{i=1}^{n} (1-d_i)d_i \sum_{i=1}^{n} (1-d_i)y_i}{\sum_{i=1}^{n} d_i^2 \sum_{i=1}^{n} (1-d_i)^2 - \sum_{i=1}^{n} (1-d_i)d_i \sum_{i=1}^{n} (1-d_i)d_i}$$

Thus, the y-coordinate (ordinate) of the center of each of the real markers $M_1'$ and $M_2'$ is determined.

Another example of the vector fitting will now be described with reference to FIG. 7. This method is capable of correctly detecting a target point if the point is one and some pieces of positional information are relatively obtained.

Figures 7, 8:
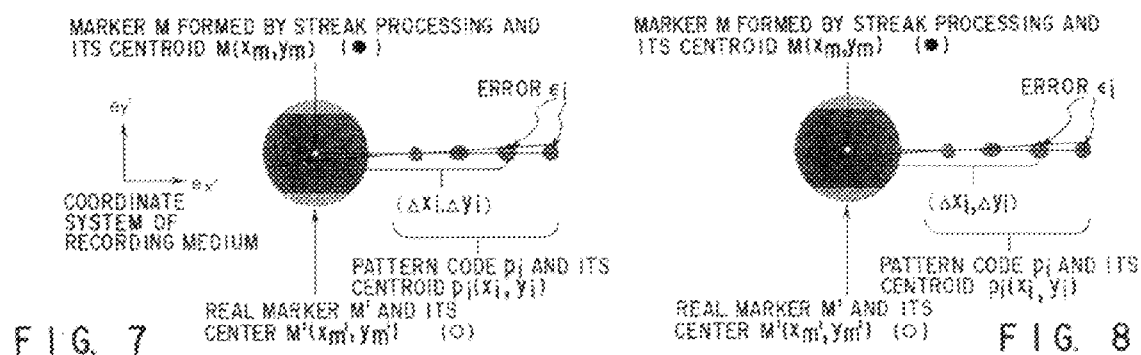
FIG. 7 is a view for explaining another example of the vector fitting.
FIG. 8 is a view for explaining the point fitting.

In FIG. 7, a correct circle is shown by M' as a real marker, and its center (real center) is expressed by $M'(x_m', y_m')$ and indicated by a small white spot. On the other hand, an incomplete circle is shown as a marker M which is formed directly by the streak processing, i.e., from an image, and its centroid (approximate center) is expressed by $M(x_m, y_m)$ and indicated by a small black spot. Also the coordinates of the centroid $p_i(x_i, y_i)$ of a pattern code pi are represented by position $(\Delta x_i, \Delta y_i)$ relative to the approximate center.

According to the vector fitting, a black dot $P_1$ of the pattern code $p_i$, which is nearest to the centroid $M(x_m, y_m)$ of the marker M formed by the streak processing and indicated by a black spot, is detected first. This detection is performed by searching the radius $\sqrt{\Delta x_1^2 + \Delta y_1^2}$ of the marker M in accordance with format information when the centroid of the marker M is considered to be the center thereof. If the pattern code $p_1$ is detected, its centroid $p_1(x_x, y_1)$ can be obtained by the well-known method. The coordinates $p_i'(x_i', y_i')$ where another pattern code is to be located, can thus be estimated by extending a segment connecting the centroid $p_1(x_1, y_1)$ and the centroid $M(x_m, y_m)$ of the marker M.

If the estimated coordinates (centroid) $p_i'(x_i', y_i')$ are expressed by the center $M'(x_m', y_m')$ of the real marker M' and unit vectors $e_x'$ and $e_y'$ of a recording medium, the following equations are obtained.

$$\begin{cases} x_i' = x_m' + \Delta x_i e_x' \\ y_i' = y_m' + \Delta y_i e_y' \end{cases}$$

The unit vectors $e_x'$ and $e_y'$ are symbols for describing how the coordinate system of the recording medium, i.e., the plane thereof is. More specifically, in FIG. 7, the pattern code pi is formed $\Delta x_i$, $\Delta y_i$ away from the approximate center. However, on the plane of the recording medium, each pixel does not always correspond to its design value and thus an error may occur. In fact, one pixel is hardly recorded completely. For example, when ninety percent of one pixel is formed, the pattern code pi is located nine dots away from the centroid in the actual image even if a design value indicates that the pattern code $p_1$ is located ten dots away therefrom. In this case, it can be determined mathematically whether the difference between the design and actual values is due to the centroid $M(x_m, y_m)$ of marker M or the basic vector.

The distance between the estimated pattern code's centroid $p_i'(x_i', y_i')$ and the actual pattern code's centroid $p_i(x_i, y_i)$ is represented by error $\epsilon_i$. This error is caused because the centroid of the marker does not coincide with the correct center. If, therefore, the error $\epsilon_i$ is minimized, the correct central coordinates can be estimated. Now evaluation function E to be minimized is given by the following equation.

$$E = \sum_{i=1}^{n} \epsilon_i^2 = \sum_{i=1}^{n} \{(x_i' - x_i)^2 + (y_i' - y_i)^2\}$$

$$= \sum_{i=1}^{n} \{(x_m' + \Delta x_i e_x' - x_i)^2 + (y_m' + \Delta y_i e_y' - y_i)^2\}$$

To minimize the evaluation function E, it is partially differentiated by $x_m'$ and $e_x'$ as follows.

$$\frac{\partial E}{\partial x_m'} = \sum_{i=1}^{n} 2(x_m' + \Delta x_i e_x' - x_i) = 0 \rightarrow$$

$$nx_m' + e_x' \sum_{i=1}^{n} \Delta x_i - \sum_{i=1}^{n} x_i = 0$$

$$\frac{\partial E}{\partial e_x'} = \sum_{i=1}^{n} 2(x_m' + \Delta x_i e_x' - x_i) = 0 \rightarrow$$

$$x_m' \sum_{i=1}^{n} \Delta x_i + e_x' \sum_{i=1}^{n} \Delta x_i^2 - \sum_{i=1}^{n} \Delta x_i x_i = 0$$

By solving the above simultaneous equations, the following are obtained.

$$x_m' = \frac{\sum_{i=1}^{n} \Delta x_i^2 \sum_{i=1}^{n} x_i - \sum_{i=1}^{n} \Delta x_i \sum_{i=1}^{n} \Delta x_i x_i}{n \sum_{i=1}^{n} \Delta x_i^2 - \sum_{i=1}^{n} \Delta x_i \sum_{i=1}^{n} \Delta x_i}$$

$$e_x' = \frac{n \sum_{i=1}^{n} \Delta x_i x_i - \sum_{i=1}^{n} \Delta x_i \sum_{i=1}^{n} x_i}{n \sum_{i=1}^{n} \Delta x_i^2 - \sum_{i=1}^{n} \Delta x_i \sum_{i=1}^{n} \Delta x_i}$$

Thus, the x-coordinate $x_m'$ of the center of the real marker $M_1'$ and the unit vector $e_x'$ in the x direction, are calculated.

Similarly, if the evaluation function E is partially differentiated by $y_m'$ and $e_y'$ as follows, the y-coordinate $y_m'$ of the center of the real marker $M_1'$ and the unit vector $e_y'$ in the y direction, are calculated.

$$y_m' = \frac{\sum_{i=1}^{n} \Delta y_i^2 \sum_{i=1}^{n} y_i - \sum_{i=1}^{n} \Delta y_i \sum_{i=1}^{n} \Delta y_i y_i}{n \sum_{i=1}^{n} \Delta y_i^2 - \sum_{i=1}^{n} \Delta y_i \sum_{i=1}^{n} \Delta y_i}$$

$$e_y' = \frac{n \sum_{i=1}^{n} \Delta y_i y_i - \sum_{i=1}^{n} \Delta y_i \sum_{i=1}^{n} y_i}{n \sum_{i=1}^{n} \Delta y_i^2 - \sum_{i=1}^{n} \Delta y_i \sum_{i=1}^{n} \Delta y_i}$$

In the above equations, n denotes the number of pattern codes. In the example of FIG. 7, four pattern codes are formed and thus n is equal to four.

As described above, the correct centroid of marker M, that is, the real center $M'(x_m', y_m')$ and the unit vectors $e_x'$ and $e_y'$, which implies whether one pixel is complete or not, are calculated at the same time.

As another example of the error minimizing method, the point fitting will be described with reference to FIG. 8. This method is based on the same concept as that of the vector fitting shown in FIG. 7, except that no vectors are estimated. In other words, when an image is picked up by a line sensor, if it is assumed that neither optical distortion nor optical inclination is present, the coordinate system of the recording medium need not be determined.

According to the point fitting, a pattern code $P_1$, which is nearest to the centroid $M(x_m, y_m)$ of marker M formed by the streak processing and indicated by a black spot, is detected first, the distance between them being $\sqrt{\Delta x_1^2 + \Delta y_1^2}$. By extending a segment connecting the centroid $p_1(x_1, y_1)$ of the code p1 and the centroid $M(x_m, y_m)$ of the marker M, the coordinates $p_i'(x_i', y_i')$ where another pattern code is to be located, can be estimated.

If the estimated coordinates (centroid) $p_i'(x_i', y_i')$ are expressed by the center $M'(x_m', y_m')$ of real marker M', the following equations are given.

$$\begin{cases} x_i' = x_m' + \Delta x_i \\ y_i' = y_m' + \Delta y_i \end{cases}$$

The distance between the estimated pattern code's centroid $p_i'(x_i', y_i')$ and the actual pattern code's centroid $p_i(x_i, y_i)$ is represented by error $\epsilon_i$. This error is caused because the centroid of the marker does not coincide with the correct center. If, therefore, the error $\epsilon_i$ is minimized, the correct central coordinates can be estimated. Now evaluation function E to be minimized is given by the following equation.

$$E = \sum_{i=1}^{n} \epsilon_i^2 = \sum_{i=1}^{n} \{(x_i' - x_i)^2 + (y_i' - y_i)^2\}$$

$$= \sum_{i=1}^{n} \{(x_m' + \Delta x_i - x_i)^2 + (y_m' + \Delta y_i - y_i)^2\}$$

To minimize the evaluation function E, it is partially differentiated by $x_m'$ and $y_m'$ as follows.

$$\frac{\partial E}{\partial x_m'} = \sum_{i=1}^{n} 2(x_m' + \Delta x_i - x_i) = 0 \rightarrow$$

$$nx_m' + \sum_{i=1}^{n} \Delta x_i - \sum_{i=1}^{n} x_i = 0$$

$$\frac{\partial E}{\partial y_m'} = \sum_{i=1}^{n} 2(y_m' + \Delta y_i - y_i) = 0 \rightarrow$$

$$ny_m' + \sum_{i=1}^{n} \Delta y_i - \sum_{i=1}^{n} y_i = 0$$

Thus, the centroid of the real marker, i.e., the coordinates $(x_m', y_m')$ of the real center can be calculated as expressed by the following equations.

$$x_m' = \frac{1}{n} \left( \sum_{i=1}^{n} x_i - \sum_{i=1}^{n} \Delta x_i \right)$$

$$y_m' = \frac{1}{n} \left( \sum_{i=1}^{n} y_i - \sum_{i=1}^{n} \Delta y_i \right)$$

Figure 9:
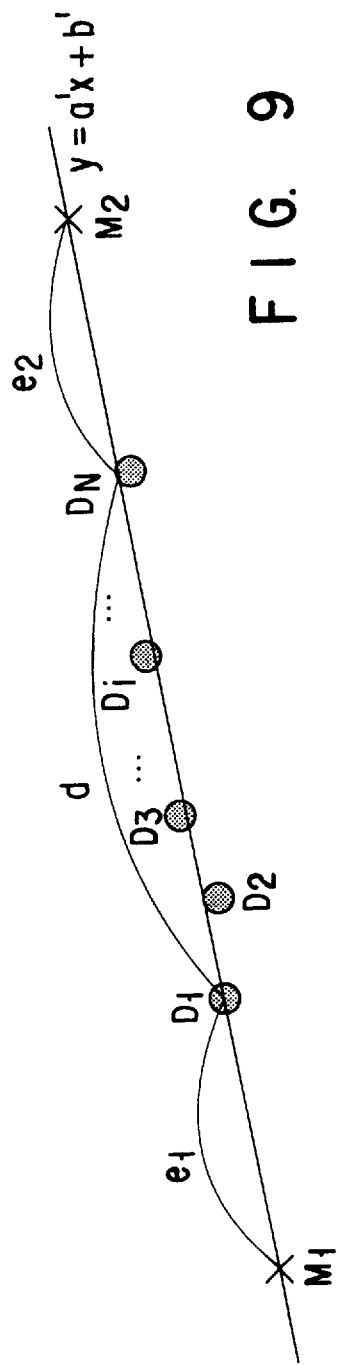
FIG. 9 is a view for explaining the line fitting.

As still another example of the error minimizing method, the line fitting will now be described with reference to FIG. 9. The line fitting employs the method of least squares.

Assume that a straight line on which dots are present is given by $y = a'x + b'$ and the coordinates of the i-th dot Di to be observed are defined as $D_i(x_i, y_i)$.

Error $\epsilon_i$ between $y_i'$ and $y_i$, estimated from the above equation of the straight line, is shows as follows.

$$\epsilon_i y_i' - y_i = a'x_i + b' - y_i$$

To minimize the evaluation function (square sum) E of the error for all the dots to be observed, a' and b' are estimated as follows.

$$E = \sum_{i=1}^{n} \epsilon_i^2 = \sum_{i=1}^{n} (a'x_i + b' - y_i)^2$$

-continued $$\frac{\partial E}{\partial a'} = \sum_{i=1}^{n} 2(a'x_i + b' - y_i)x_i = 0 \quad (1)$$

$$\frac{\partial E}{\partial b'} = \sum_{i=1}^{n} 2(a'x_i + b' - y_i) = 0 \quad (2)$$

From the above equations (1) and (2), the following are obtained.

$$a' \sum_{i=1}^{n} x_i^2 + b' \sum_{i=1}^{n} x_i = \sum_{i=1}^{n} x_i y_i \quad (3)$$

$$a' \sum_{i=1}^{n} x_i + b'N = \sum_{i=1}^{n} y_i \quad (4)$$

From $(3) \times N - (4) \times \sum_{i=1}^{n} x_i,$ \quad (5)

$$a'N \sum_{i=1}^{n} x_i^2 - a' \left( \sum_{i=1}^{n} x_i \right)^2 = N \sum_{i=1}^{n} x_i y_i - \sum_{i=1}^{n} x_i \sum_{i=1}^{n} y_i$$

$$a' = \frac{N \sum_{i=1}^{n} x_i y_i - \sum_{i=1}^{n} x_i \sum_{i=1}^{n} y_i}{N \sum_{i=1}^{n} x_i^2 - \left( \sum_{i=1}^{n} x_i \right)^2}$$

From $(3) \times \sum_{i=1}^{n} x_i - (4) \times \sum_{i=1}^{n} x_i^2,$ \quad (6)

$$b' \left( \sum_{i=1}^{n} x_i \right)^2 - b'N \sum_{i=1}^{n} x_i^2 = \sum_{i=1}^{n} x_i \sum_{i=1}^{n} x_i y_i - \sum_{i=1}^{n} x_i^2 \sum_{i=1}^{n} y_i$$

$$b' = \frac{\sum_{i=1}^{n} x_i^2 \sum_{i=1}^{n} y_i - \sum_{i=1}^{n} x_i \sum_{i=1}^{n} x_i y_i}{N \sum_{i=1}^{n} x_i^2 - \left( \sum_{i=1}^{n} x_i \right)^2}$$

Here the x-coordinate $x_0$ of marker $M_1$ is obtained from $D_1$ and $D_N$ by extrapolation, as follows.

$$x_0 = e_1/d(x_1 - x_N) + x_1$$

By substituting the above into the equation of the straight line, the y-coordinate $y_0$ of marker $M_1$ is given as follows.

$$y_0 = a'x_0 + b$$

The x- and y-coordinates of marker $M_2$ can be obtained in the same manner.

A modification to the two-dimensional code pattern to which the above-described error minimizing methods are applied, will now be described.

Figures 10, 11:
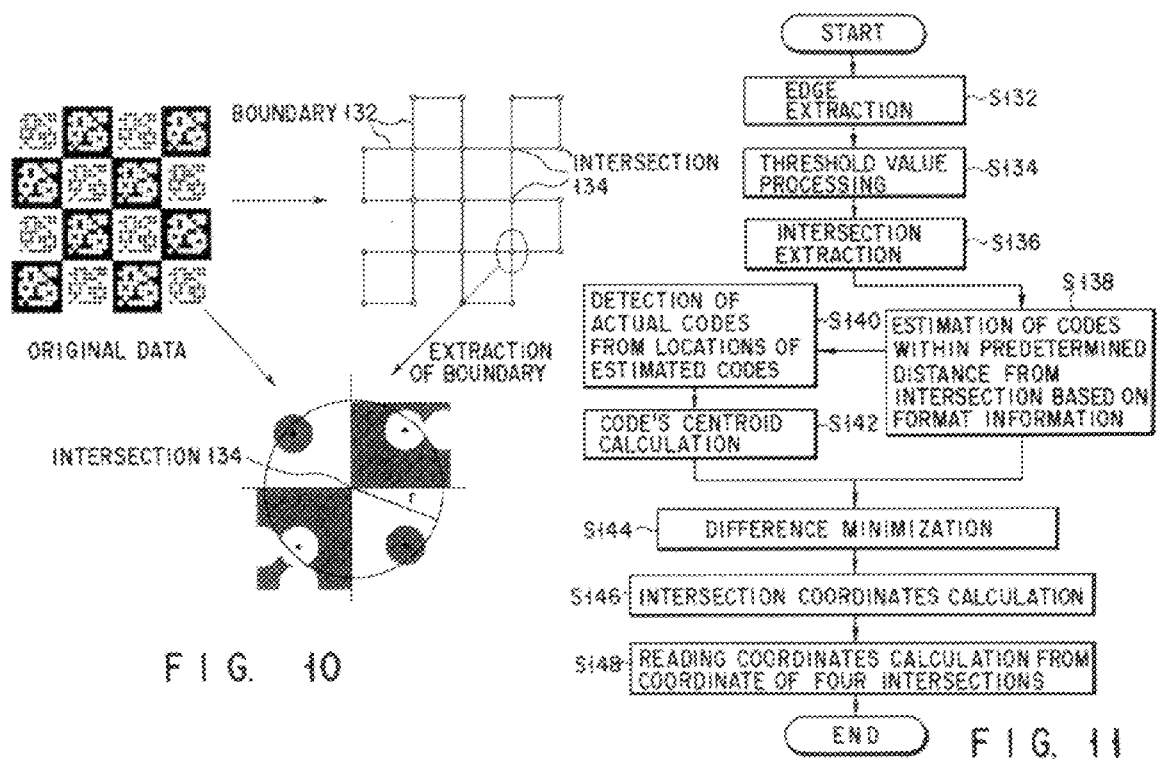
FIG. 10 is a view for explaining a two-dimensional code pattern having a format in which black and white dots are inverted alternately in blocks, and a coordinates calculating reference point in this pattern.
FIG. 11 is a flowchart of a reading coordinates calculating operation in the two-dimensional code pattern shown in FIG. 10.

FIG. 10 illustrates an example where black and white are inverted alternately in blocks. In this example, the markers, which are larger than the data codes, are not required and the recording density can be increased accordingly.

The reading coordinates calculation of the code pattern as shown in FIG. 10 is performed as follows. As is apparent from the flowchart of FIG. 11, an edge is extracted (step s132) and a threshold value is processed (step S134) to determine boundaries 132. The intersections 134 of the boundaries 132 are then extracted (step S136). These procedures are well-known and therefore their descriptions are omitted.

After the intersections 134 are extracted, the dots of a data code within a predetermined distance (radius r) from each of the intersections 135, are estimated on the basis of format information (step S138).

Since the estimated dots are slightly shifted from those of the actual data codes, the latter dots are detected from the locations of the former dots (step S140) to obtain the actual centroids thereof (step S142).

In order to minimize a difference in centroid between the dots estimated in step S138 and those of the actual data code obtained in step S142 (step S144), the coordinates of the intersections 134 are reset (step S146). If four intersections 134 are obtained, the coordinates of four corners of a block can be determined and thus the reading coordinates are calculated such that the block can be divided into lattice (step S148).

In the example shown in FIG. 10, not a pattern code but the boundaries 132 are used for obtaining a coordinates calculating reference point, and not the marker's real center but the intersections 134 are employed as the reference point. Consequently, the recording density can be improved further without using markers or pattern codes.

Figure 12:
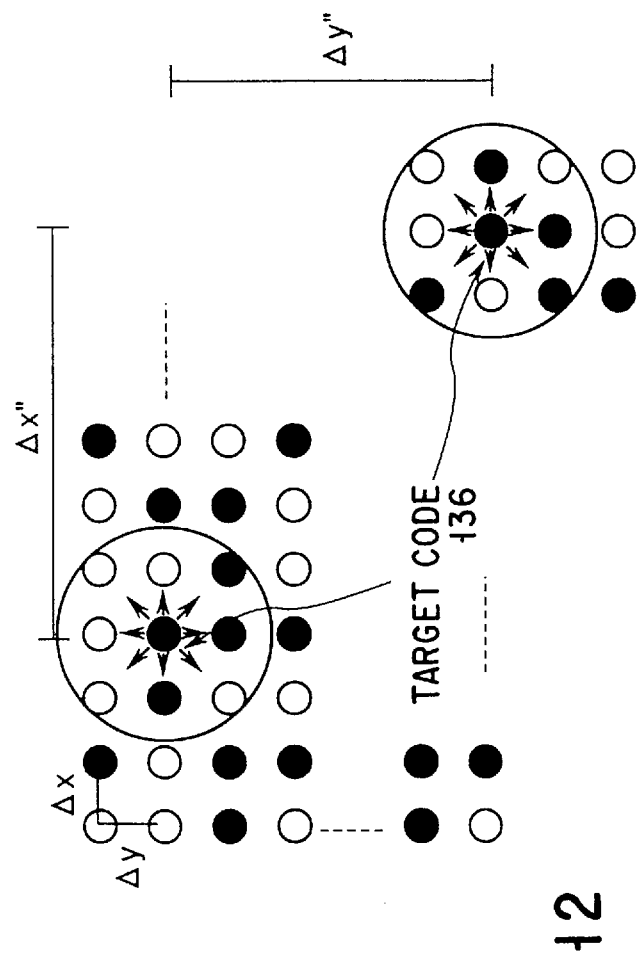
FIG. 12 is a view for explaining an example of using a data code as a coordinate calculating reference point.

FIG. 12 illustrates a two-dimensional code pattern wherein a data code is used as a coordinates calculating reference point. In this code pattern, the respective dots of the data code are separated from one another by the value of $\Delta x$ or $\Delta y$, and this value is provided in advance as format information.

Figure 13:
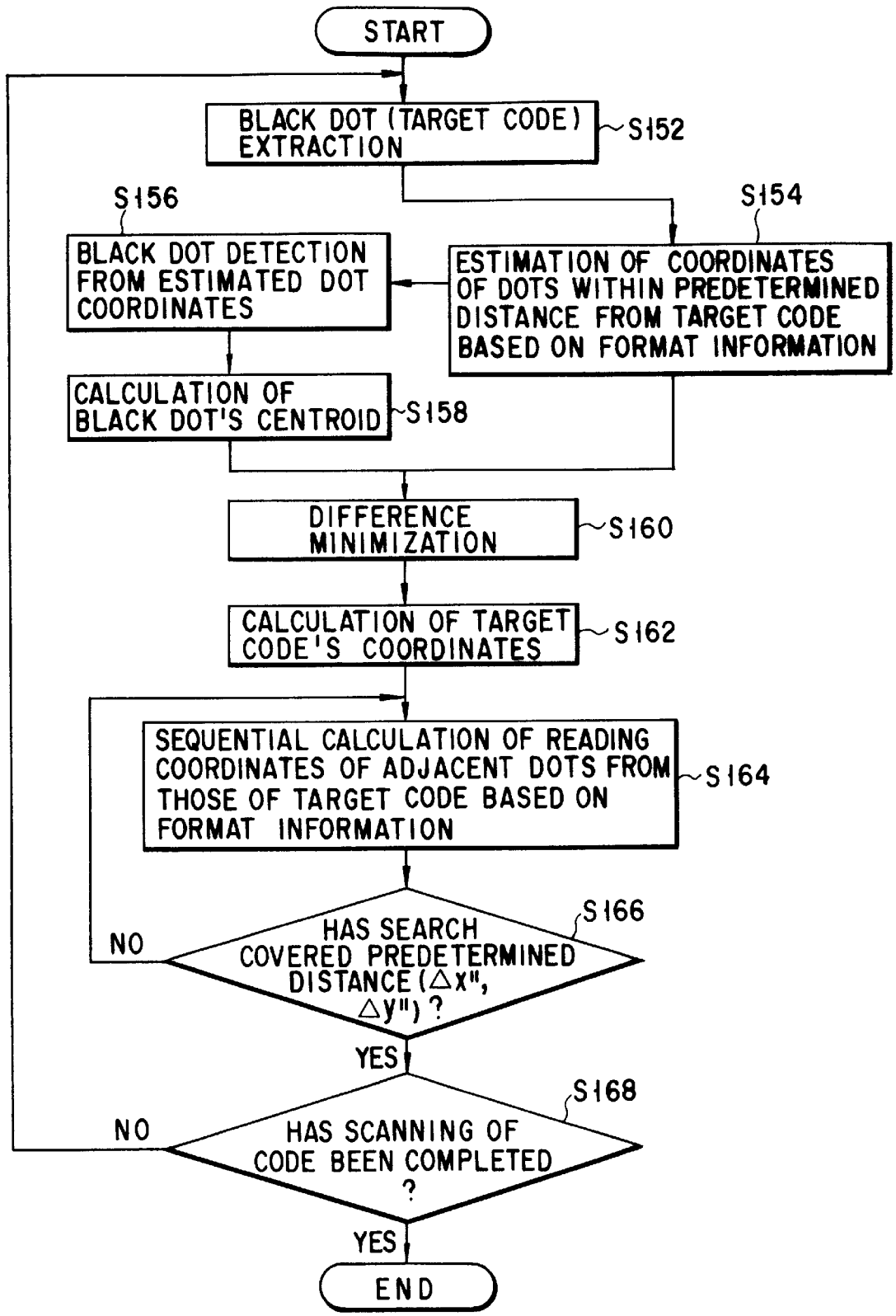
FIG. 13 is a flowchart of a reading coordinates calculating operation in the example shown in FIG. 12.

The reading coordinates in the code pattern of FIG. 12 are calculated in accordance with the flowchart shown in FIG. 13. The data code is scanned from its end until a black dot is extracted first, and the extracted black dot is defined as a target code 136 (step S152).

Then, the coordinates of dots within a predetermined range (circled in FIG. 12) are estimated from the target code 136 based on the format information (step S154).

In this example, a search is made in eight directions to detect the actual black dots from the estimated coordinates (step S156), and the centroids of the black dots are calculated by the well-known method (step S158).

The estimated coordinates are shifted from those of the centroids of the actual black dots. As described above, in order to minimize a difference between them (step S160), the coordinates of the target code 136 are reset (step S162).

If the exact coordinates of the target code 136 are determined, the reading coordinates of adjacent dots are sequentially calculated from the coordinates of the target code based on the format information (step S164). In other words, the calculation is performed by sequentially shifting from the target code 136 by the value of $\Delta x$ or $\Delta y$.

In view of a problem of printing precision, errors are accumulated as the shit is repeated; thus the calculation should be refreshed periodically. More specifically, the shift from the target code 136 by the value of $\Delta x$ or $\Delta y$ is repeated until the search separates at a predetermined distance ($\Delta x''$, $\Delta y''$) from the target code 136 (step S166). Reaching the predetermined distance, it is confirmed whether the scanning of the two-dimensional code is completed (step S168), and then the above-described processing is repeated from step S152. By doing so, the errors are prevented from being accumulated, and the coordinates can be calculated with high precision.

Figure 14:
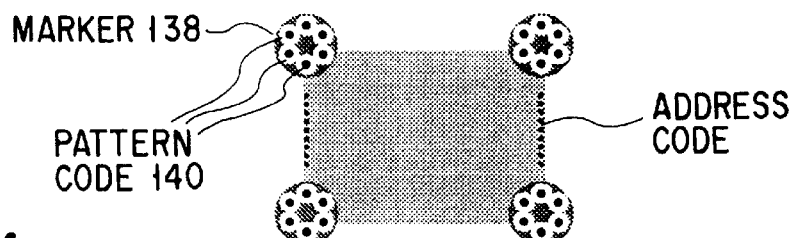
FIG. 14 is a view of a two-dimensional code pattern in which a large marker includes pattern codes.

FIG. 14 illustrates a two-dimensional code pattern wherein a large marker 138 includes a pattern code 130. In this code pattern, since the marker and code are formed integral with each other, the pattern code 120 as shown in FIG. 3A is unnecessary, and the area occupied by them is used as a recording area for data codes (data code area 114 in FIG. 3), thus improving in recording density.

Figure 15:
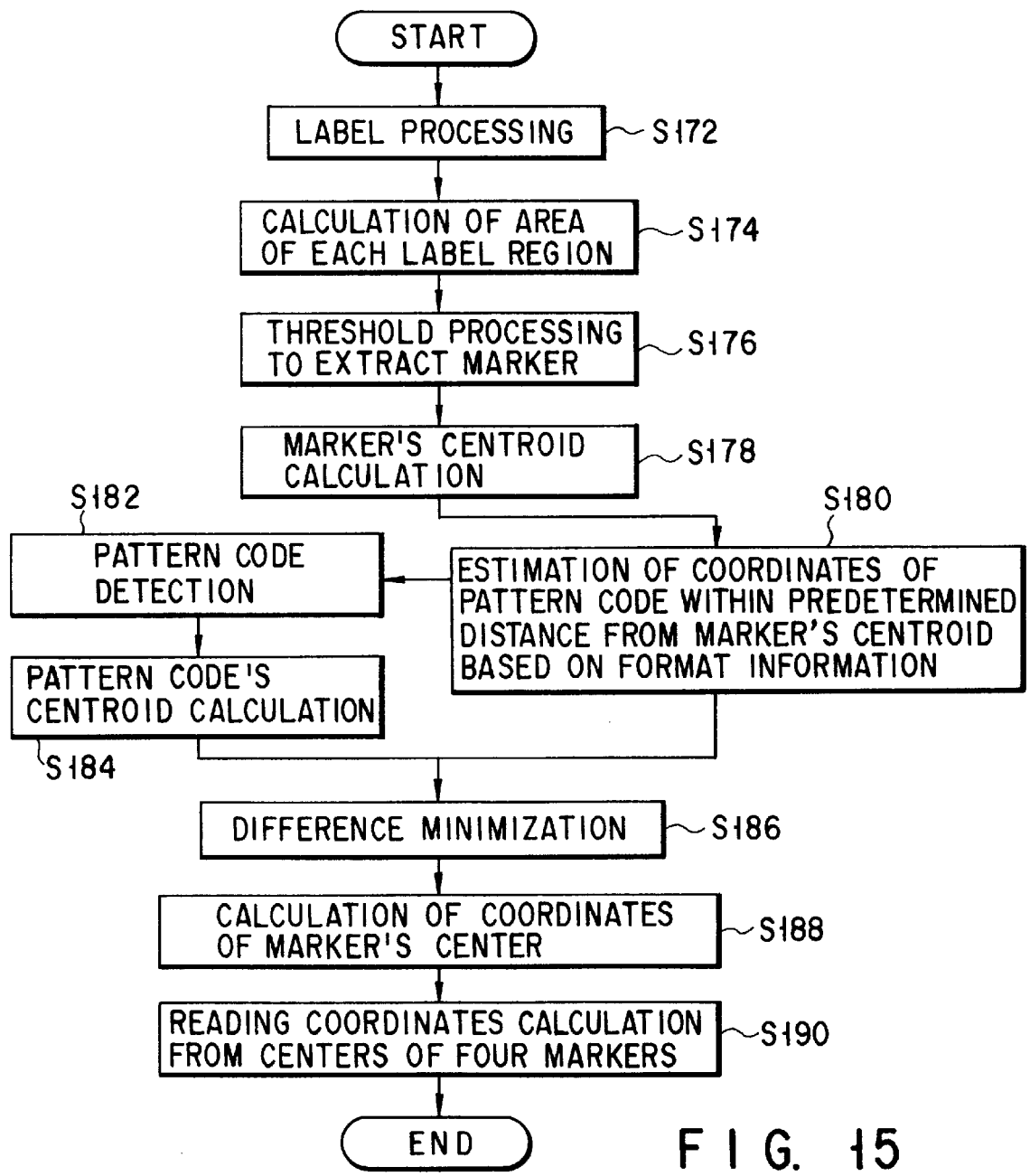
FIG. 15 is a flowchart of a reading coordinates calculating operation in the two-dimensional code pattern shown in FIG. 14.

The calculation of reading coordinates in the two-dimensional code pattern shown in FIG. 14 is performed in accordance with the flowchart of FIG. 15. First, label processing is executed to extract label regions each having a large area (step S172) and then the area of each label region is calculated (step S174). Only the large marker 138 is extracted by threshold processing (step S176), and its centroid is calculated by the well-known method (step S178).

Next the coordinates of the pattern code 140 within a predetermined distance from the centroid of the marker 138 are estimated based on format information (step S180).

The actual pattern code 140 is thus detected from the estimated coordinates (step S182), and its centroid is calculated by the well-known method (step S184).

To minimize a difference between the estimated coordinates and the centroid of the actual pattern code (step S186), the centroid of the marker 138 is calculated again (step S188). If the coordinates of the real center of the marker 138 is obtained, the reading coordinates are calculated from the centers of four markers 138 (step S190).

The dots of the pattern code are arranged in line between the markers 118 as shown in FIG. 3A. However, various arrangements are possible as follows.

Figure 16A:
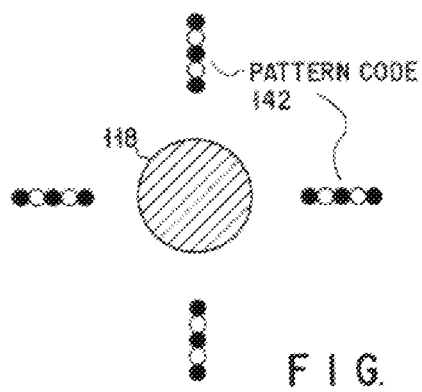
FIGS. 16A to 16D are views each showing another format of pattern codes.

FIG. 16A illustrates a two-dimensional code pattern wherein four pattern codes 142 are arranged around one marker 118 with a predetermined distance between the pattern codes and marker. This code pattern can be decreased in error as compared with that of FIG. 3 wherein a pattern code is formed in line between markers. Since, furthermore, the pattern codes are arranged in vertical direction as well as horizontal direction, the reading precision is enhanced. If the pattern codes simply extend in the horizontal direction, an error for the Y-axis is reduced by the error minimizing method described above. If, however, they extend in the direction perpendicular to the horizontal direction, the error for the Y-axis can be increased, with the result that the reading coordinates are calculated more accurately.

Figure 16B:
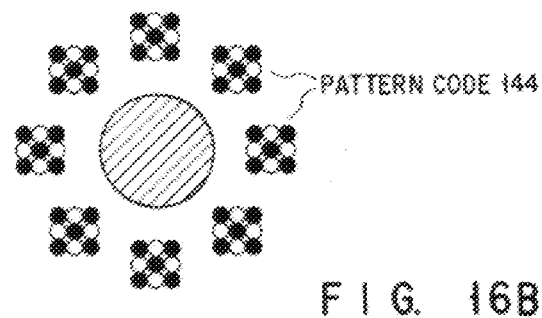

FIG. 16B illustrates a two-dimensional code pattern wherein eight pattern codes 144 are arranged around a marker with a predetermined interval therebetween. Such arrangement increases the reading precision.

Figure 16C:
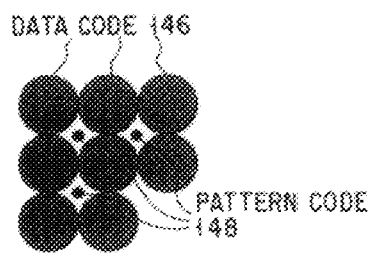

FIG. 16C shows a two-dimensional code pattern wherein a pattern code 148 is formed in a gap between respective dots of data codes 146. The gap is always formed since the data codes 146 are recorded as round dots, and therefore no areas exclusively for the pattern codes are required and high-density recording can be made. In the code pattern of FIG. 16C, since the dots of the pattern codes 148 are small, the reliability per dot is lowered; however, the reliability in its entirety is enhanced by increasing the number of dots of the pattern codes 148 to about one thousand.

Figure 16D:
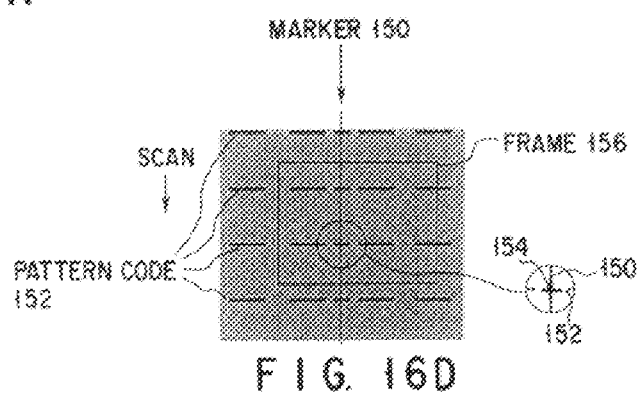

FIG. 16D shows a two-dimensional code pattern using a linear marker 150. The linear marker 150 is formed vertically to pass the central portion of the pattern, pattern codes 152 are arranged horizontally at regular intervals, and horizontal lines 154 are formed such that each of them crosses the marker 150 in a position where its corresponding pattern code 152 is provided.

When the pattern is scanned in units of frame, the marker 150 extends vertically within a frame 156. The marker 150 can thus be detected by extracting the upper and lower areas connected to the frame. After the detection of the marker 150, the intersections between the marker and horizontal lines 154 are detected. The pattern codes 152 are, therefore, each located at a predetermined distance from the corresponding intersection.

Consequently, in the pattern shown in FIG. 16D, the area of the linear marker 150 is smaller than that of the foregoing large black dot; accordingly, the recording density can be increased. Moreover, as compared with the streak processing described above, the processing of finding a line or dots connecting up and down in the frame can be executed easily and quickly.

FIG. 17 shows a format of deblocked pattern codes, i.e., a format of pattern codes within a frame 156 as one unit. More specifically, tow-dimensional pattern codes are recorded in double height (data a and data b are the same), and pairs of marker 118 and pattern code 120 are arranged in cascade in right and left data codes. Even though the frame 156 is scanned up and down, at least two of the pairs are located within the frame. Thus, the real centers of at least three markers 118 are fixed, and the reading coordinates can be determined.

In the example of FIG. 17, the recording density is enhanced by arranging the combinations of markers and pattern codes in every other row.

FIG. 18 shows an example of multiple recording of pattern codes. In this example, data codes 158 are printed within a block, and markers, pattern codes and address codes are aligned and printed thereon by transparent printing (transparence is represented by white dots 160). The transparent printing is performed using a transparent ink which generates fluorescence in accordance with irradiation of ultraviolet fluorescence or the like. In FIG. 18, the transparent printing is represented by white spots indicated by numeral 160.

The transparent ink can be replaced with a magnetic ink. Using the magnetic ink, the markers, pattern codes and address codes are printed, these are printed whitely, and the data codes are printed thereon. In this case, both optical and magnetic sensors are required for recording data, but the recording density (recording capacity) can be improved since neither markers nor pattern codes influence the area where the data is recorded.

FIG. 19 shows an example of special printing of markers 162. If the markers 162 are printed by special ink such as color, magnetic and fluorescent inks, the markers can be reduced to the size not larger than that of data codes.

Figure 20:
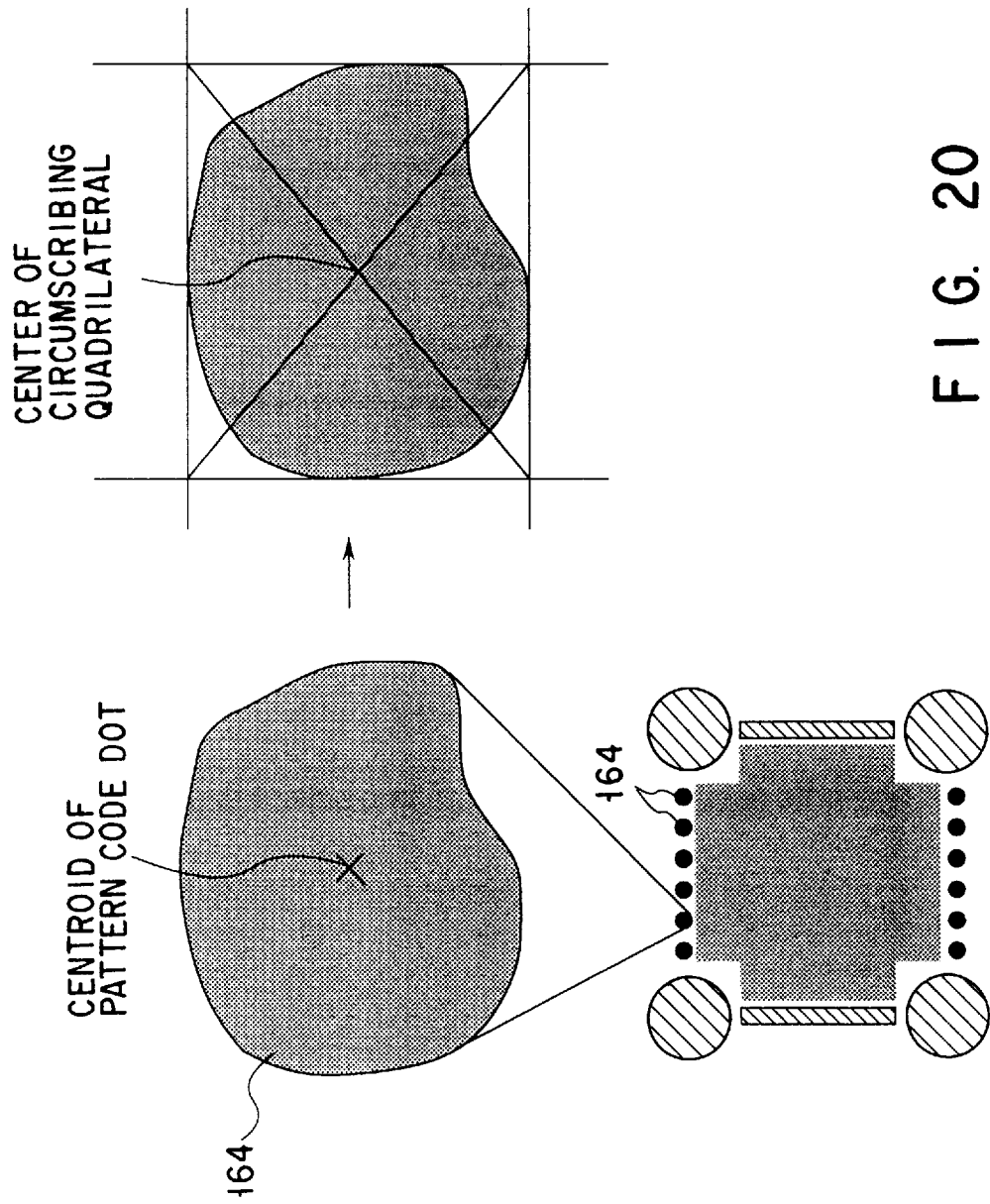
FIG. 20 is a view for explaining an example of calculating the center of a circumscribing quadrilateral of each dot of pattern codes by another method of obtaining the real center of a marker using pattern codes.

According to the foregoing descriptions of the present invention, the real center of a marker is obtained from the centroid of each dot of a pattern code using the error minimizing method. If, as shown in FIG. 20, the center of a circumscribing quadrilateral of each dot 164 of a pattern code can be substituted, the processing of calculating the centroid can be lightened without decreasing the accuracy of the real center.

Other different formats of two-dimensional pattern codes will now be described.

FIG. 21A shows a format of pattern codes 120 which are arranged in line not between markers 118 but in the middle of a data code area 114. FIG. 21B illustrates a format of pattern codes 166 each disposed halfway between markers 118. FIG. 21C shows a format of pattern codes 168 gathered in the middle of a block.

FIG. 22A shows a two-dimensional code pattern free from pattern codes, and FIG. 22B does an image of the pattern within one frame. In this pattern, markers are substituted for the pattern codes, that is, markers are employed as a group of pattern matching dots.

In the patterns shown in FIGS. 21A to 21C and FIGS. 22A and 22B, too, the reference coordinates of each block, indicated by outlined Xs, (in FIG. 21B, the pattern codes 166 correspond to reference coordinates, though no outlined Xs are shown in view of the size of the sheet) can be calculated by the foregoing vector fitting and point fitting or the following rectangle fitting. If the undermentioned processing is executed on the basis of the calculated reference coordinates, the locations of the respective dots can be detected with high precision.

Referring to the code pattern shown in FIG. 22A, the rectangle fitting will now be explained.

There are four straight lines connecting the approximate centers of the markers 118, and one of the lines is given by the following equation.

$$y = a_1 x + b_1$$

Since the relationship in position between this line and the other three lines is determined, the three lines can be expressed by the following equations using parameters $a_1$ and $b_1$.

$$y = -\frac{1}{a_1} x + b_1 + C_2\{a_1\}$$

$$y = a_1 x + b_1 + C_3\{a_1\}$$

$$y = -\frac{1}{a_1} x + b_1 + C_4\{a_1\}$$

The terms $C_2\{a_1\}$, $C_3\{a_1\}$ and $C_4\{a_1\}$ are functions of $a_1$.

The approximate centers of the four markers 118 are fitted to the four straight lines and, in this case, the least square approximation is used.

Now assuming that the coordinates of the approximate centers of the four markers are $M_1(x_1, y_1)$, $M_2(x_2, y_2)$, $M_3(x_3, y_3)$, and $M_4(x_4, y_4)$, respectively, their evaluation functions $E_1$ to $E_4$ are represented by the following equations.

$$E_1 = (y_1 - a_1 x_1 + b_1)^2 + (y_2 - a_1 x_2 + b_1)^2$$

$$E_2 = \left(y_2 + \frac{1}{a_1} x_2 + b_1 + C_2\{a_1\}\right)^2 + \left(y_3 + \frac{1}{a_1} x_3 + b_1 + C_2\{a_1\}\right)^2$$

$$E_3 = (y_3 - a_1 x_3 + b_1 + C_3\{a_1\})^2 + (y_4 - a_1 x_4 + b_1 + C_3\{a_1\})^2$$

$$E_4 = \left(y_4 + \frac{1}{a_1} x_4 + b_1 + C_4\{a_1\}\right)^2 + \left(y_1 + \frac{1}{a_1} x_1 + b_1 + C_4\{a_1\}\right)^2$$

The evaluation function $E_{tot}$ to be minimized is therefore given as follows.

$$E_{tot} = E_1 + E_2 + E_3 + E_4$$

To minimize the evaluation function $E_{tot}$, the above parameters $a_1$ and $b_1$ are determined, and the intersections of the straight lines are defined as block reference points or coordinates calculating reference points. If, therefore, the evaluation function $E_{tot}$ is partially differentiated by the parameters as follows.

$$\frac{\partial E_{tot}}{\partial a_1} = 0 \quad \frac{\partial E_{tot}}{\partial b_1} = 0$$

Here, if $C_2\{a_1\}$, $C_3\{a_1\}$ and $C_4\{a_1\}$ each indicate distance d between markers, they can be expressed as follows.

$$C_2\{a_1\} = -\left(a_1 + \frac{1}{a_1}\right)\left(\sqrt{1+d^2} + x_4\right)$$

$$C_3\{a_1\} = -a_1\sqrt{1+d^2}$$

$$C_4\{a_1\} = -a_1\sqrt{1+d^2} - x_4\left(a_1 + \frac{1}{a_1}\right)$$

From these equations, four straight lines surrounding a block can be determined.

In more general, the evaluation function $E_{tot}$ is given by the following equation:

$$E_{tot} = \sum_i E_i$$

Here, $$E_i = \sum_j (y_j - a_i x_j + b_i)^2$$

$a_i = F_i(a_1)$, $b_i = G_i(a_1, b_1)$
where $a_i = F_i(a_1)$ and $b_i = G_i(a_1, b_1)$ ($F_i()$ is a function of $a_1$ and $G_i()$ is a function of $a_1$ and $b_1$). To minimize the value of the above equation, the following equations are resolved.

$$\frac{\partial E_{tot}}{\partial a_1} = 0 \quad \frac{\partial E_{tot}}{\partial b_1} = 0$$

The constitution of an information reproduction system using the above-described rectangle fitting, will now be described.

Referring to FIG. 23, the system includes an image input section 170 for picking up an image of two-dimensional codes printed on a recording medium. The input section binarizes the image and stores it in a frame memory 172.

A pattern code extracting section 174 extracts pattern codes from data stored in the frame memory 172 using the foregoing technique, and a regression line calculating section 176 fits the extracted pattern codes to a plurality of regression lines. A reference coordinate calculating section 178 calculates coordinates of four corners of a block, i.e., intersections of the regression lines. A data code reading coordinate generating section 180 generates reading coordinates of data codes within the block by dividing the block into lattice based on the intersections of the regression lines.

A data code reading section 182 reads the data codes stored in the frame memory 172 in accordance with the reading coordinates and then outputs them. After that, the operations of demodulation, deinterleave, error correction/detection, etc., as disclosed in International Publication No. WO 94/08314, are performed thereby to reproduce the original multimedia information.

FIG. 24 is a block diagram of a modification to the information reproduction system for reading data from the pattern codes as shown in FIGS. 21A and 21B, using the rectangle fitting.

In FIG. 24, an image input section 170 picks up an image of two-dimensional codes printed on a recording medium and binarizes the image. The binarized image is stored in a frame memory 172.

A marker's approximate center coordinate calculating section 184 calculates coordinates of approximate centers of markers using data stored in the frame memory 172. This calculation is performed by the streak processing described above. A pattern code extracting section 174 extracts pattern codes located relative to the markers, and a regression line calculating section 176 calculates a plurality of regression lines (indicated by broken lines in FIGS. 21A and 21B) based on the extracted pattern codes. A reference coordinate calculating section 178 calculates the intersections of the regression lines, i.e., reference coordinates, and a data code reading coordinate generating section 180 calculates the reading coordinates of data codes using the reference coordinates.

A data code reading section 182 reads the data codes stored in the frame memory 172 in accordance with the reading coordinates and then outputs them. After that, the operations of demodulation, deinterleave, error correction/detection, etc., as disclosed in International Publication No. WO 94/08314, are performed thereby to reproduce the original multimedia information.

FIG. 25 is a flowchart of data reading processing for one frame in the information reproduction system shown in FIG. 24.

First, the image input section 170 binarizes a frame image and stores it in the frame memory 172 (step S202). The marker's approximate center coordinate calculating section 184 calculates coordinates of approximate centers of markers from data stored in the frame memory 172 by the well-known technique (step S204).

The pattern code extracting section 174 determines whether an unused marker is present or not (step S206). If there is a marker to be processed, the section 174 extracts pattern codes, whose positional relationship is has been predetermined, from the calculated coordinates of the approximate centers (step S208). The regression line calculating section 176 calculates coordinates of centers of the extracted pattern codes (step S210) and then obtains an equation of regression lines from the calculated coordinates of centers of the pattern codes using the least square approximation (step S212).

The operation for obtaining the equation of regression lines is repeated until the number of calculations of regression lines amounts to a predetermined value (step S214). If the number is equal to the value, the reference coordinate calculating section 178 calculates intersections of the lines as a reference coordinate of one block (step S216).

It is then determined whether all the reference coordinates of one block, that is, the points of four corners of the block are all detected (step S218). If not, the flow returns to the step S212, and the above processing is repeated.

If all the reference coordinates of one block are detected, the data code reading coordinate generating section 180 connects the reference coordinates by segments and divides the segments (step S220). This means that the block is divided into lattice at which intervals the data codes are printed.

The data code reading section 182 then reads data, defining the intersections of the segments as data reading coordinates (step S222).

When the processing for one block is completed, the flow is returned to step S206 and the above-described processing is repeated. If the processing for all blocks included in the frame is completed, it is determined in step S206 that there are no unused markers, and the processing for all the blocks is finished.

FIG. 26 is a block diagram of another modification to the information reproduction system for reading data from marks corresponding to pattern codes as shown in FIGS. 22A and 22B.

As shown in FIG. 26, an image input section 170 picks up an image of two-dimensional codes printed on a recording medium and binarizes the image. The binarized image is stored in a frame memory 172.

A marker's approximate center coordinate calculating section 184 calculates coordinates of approximate centers of markers using data stored in the frame memory 172. A regression line calculating section 176 calculates a plurality of regression lines from the calculated coordinates of the approximate centers. A reference coordinate calculating section 178 calculates intersections of the regression lines, i.e., reference coordinates. A data code reading coordinate generating section 180 calculates reading coordinates of data codes using the reference coordinates.

A data code reading section 182 reads the data codes stored in the frame memory 172 in accordance with the reading coordinates and then outputs them. After that, the operations of demodulation, deinterleave, error correction/detection, etc., as disclosed in International Publication No. WO 94/08314, are performed thereby to reproduce the original multimedia information.

Figure 27:
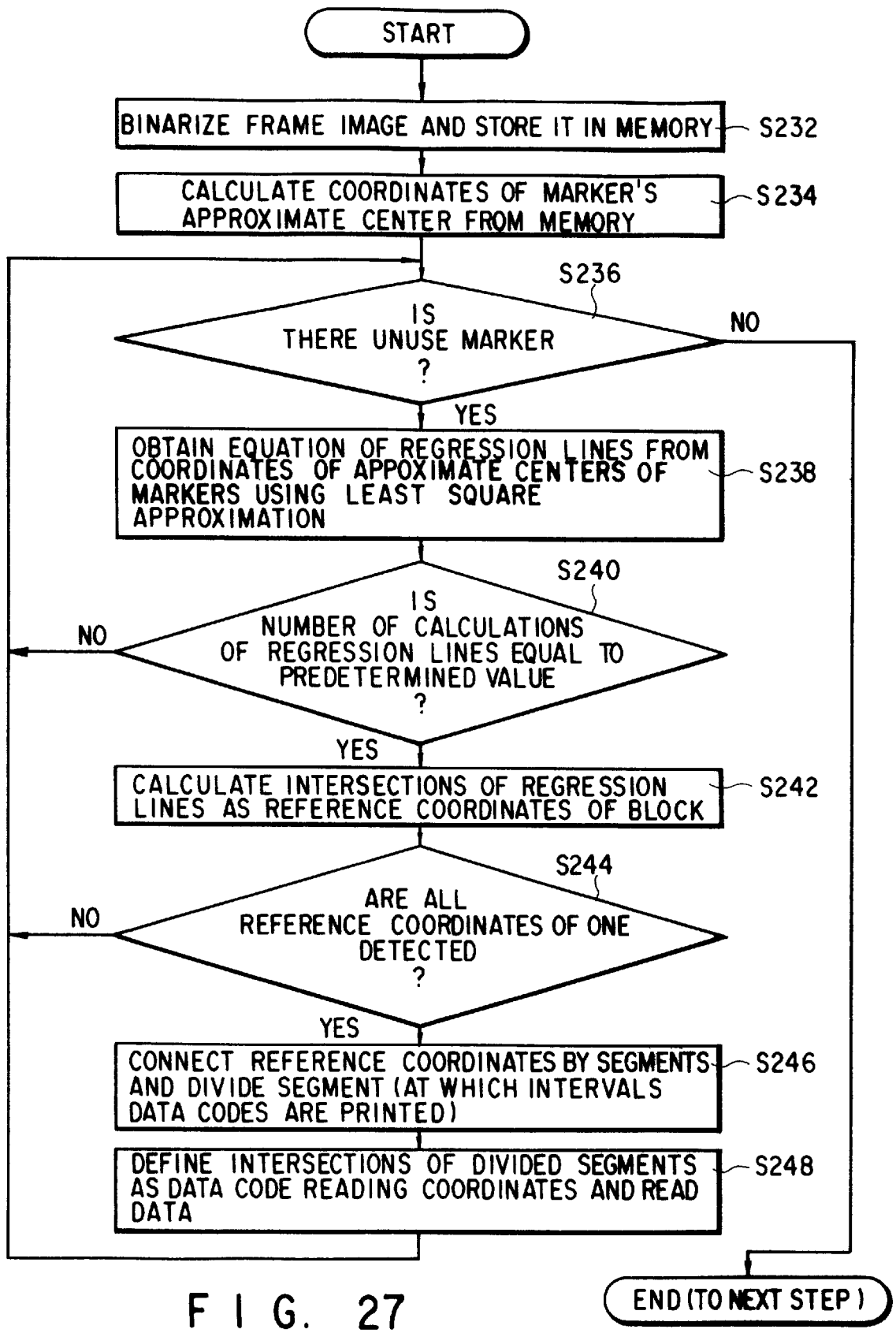
FIG. 27 is a flowchart of data reading processing for one frame in the system shown in FIG. 26.

FIG. 27 is a flowchart of data reading processing for one frame in the information reproduction system shown in FIG. 26.

First, the image input section 170 binarizes a frame image and stores it in the frame memory 172 (step S232). The marker's approximate center coordinate calculating section 184 calculates coordinates of approximate centers of markers from data stored in the frame memory 172 by the well-known technique (step S234).

The regression line calculating section 176 determines whether an unused marker is present or not (step S236). If there is a marker to be processed, the section 176 calculates an equation of regression lines from the calculated coordinates of approximate centers of markers using the least square approximation (step S238).

The operation for calculating the equation of regression lines is repeated until the number of calculations of the regression lines amounts to a predetermined value (step S240). If the number is equal to the value, the reference coordinate calculating section 178 calculates intersections of the lines as a reference coordinate of one block (step S242).

It is then determined whether all the reference coordinates of one block, that is, the points of four corners of the block are all detected (step S244). If not, the flow returns to the step S236, and the above processing is repeated.

If all the reference coordinates of one block are detected, the data code reading coordinate generating section 180 connects the reference coordinates by segments and divides the segments (step S246). This means that the block is divided into lattice at which intervals the data codes are printed.

The data code reading section 182 then reads data, defining the intersections of the segments as data reading coordinates (step S248). When the processing for one block is completed, the flow returns to step S236 and the above-described processing is repeated. If the processing for all blocks included in the frame is completed, it is determined in step S236 that there are no unused markers, and the processing for all the blocks is finished.

Figure 28:
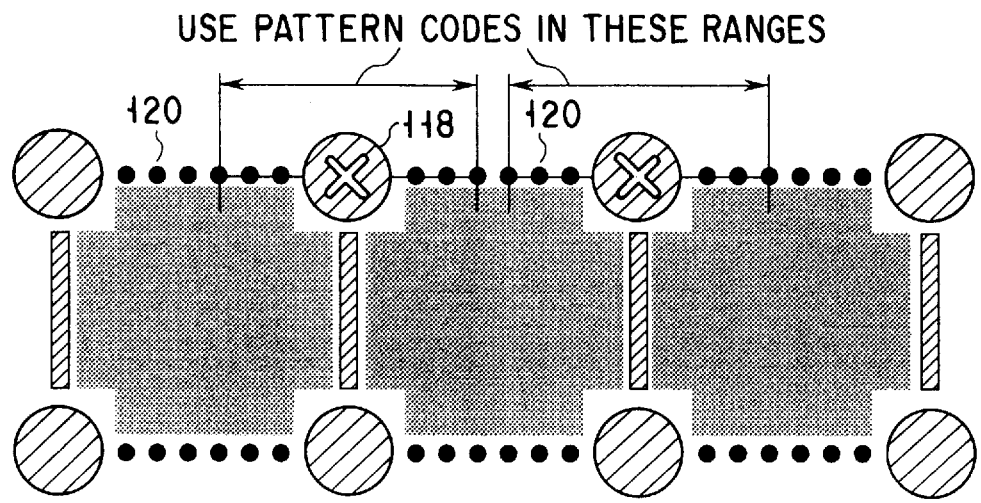
FIG. 28 is a view of an example wherein the real center of a marker is calculated by using only pattern codes arranged on both sides of and near to a marker.

Unlike in FIG. 16A showing the pattern codes arranged around a single marker and extending in four directions, if, as shown in FIG. 28, only some pattern codes 120 arranged on both sides of and near to each of markers 118 are used, the real center, i.e., the reference coordinates of the markers 118 can be obtained with high precision even though pattern codes 120 are arranged in line between the markers 118. In other words, when the pattern codes 120 are arranged in line, it is likely that an optical system of the image input section will pick up an image of the pattern codes such that the dots of the pattern codes are arranged curvedly because of distortion. If, however, the dots near to a target marker are used, an amount of shift in the dots can be reduced and thus the center of the target marker can accurately be obtained.

Figure 29:
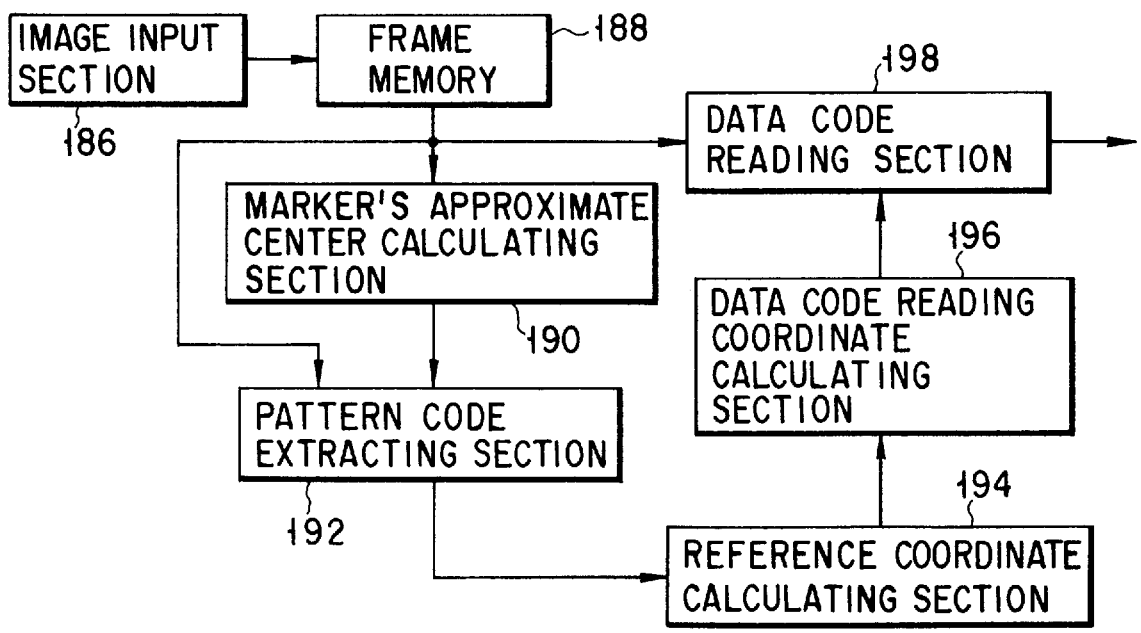
FIG. 29 is a block diagram of the constitution of an information reproduction system in the example shown in FIG. 28.

FIG. 29 is a block diagram of the constitution of an information reproduction system for reading data from the pattern codes arranged as shown in FIG. 28.

An image input section 186 picks up an image of two-dimensional codes printed on a recording medium. The image is binarized and stored in a frame memory 188.

A marker's approximate center coordinate calculating section 190 calculates coordinates of approximate center of a marker using data stored in the frame memory 188. A pattern code extracting section 192 extracts pattern codes 120 on both sides of the marker and within a predetermined distance from the approximate center thereof. A block reference coordinate calculating section 194 calculates the real center, i.e., the block reference coordinates of a marker 118 between pattern codes 120 using the error minimizing method. A data code reading coordinate calculating section 196 calculates the reading coordinates of data codes using the block reference coordinates.

A data code reading section 198 reads the data codes stored in the frame memory 188 in accordance with the reading coordinates and then outputs them. After that, the operations of demodulation, deinterleave, error correction/detection, etc., as disclosed in International Publication No. WO 94/08314, are performed thereby to reproduce the original multimedia information.

Figure 30:
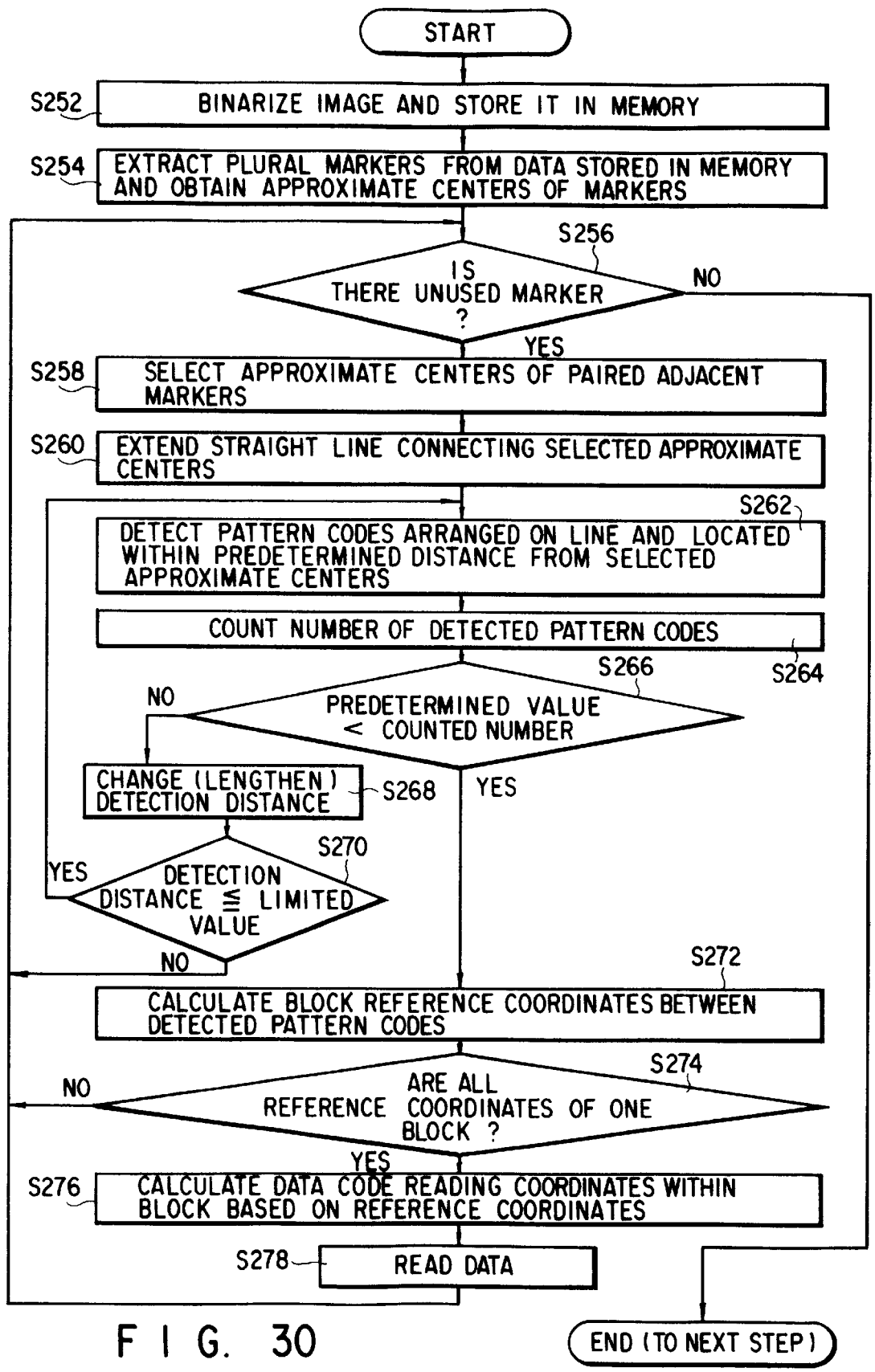
FIG. 30 is a flowchart of data reading processing for one frame in the system shown in FIG. 29.

FIG. 30 is a flowchart of data reading processing for one frame in the information reproduction system shown in FIG. 29.

First the image input section 186 binarizes a frame image and stores it in the frame memory 188 (step S252). The marker's approximate center coordinate calculating section 190 calculates coordinates of approximate centers of markers from the data stored in the frame memory 188 by the well-known technique (step S254).

The pattern code extracting section 192 determines whether an unused marker is present or not (step S256). If there is a marker to be processed, the approximate centers of paired adjacent markers are determined (step S258), and a straight line connecting these approximate centers is extended outside (step S260).

Then, pattern codes arranged on the line and located within a predetermined detection distance from each approximate center, are detected (step S262), and the detected pattern codes are counted (step S264). It is determined whether the counted number reaches a predetermined value (step S266). If not, the detection distance is changed (lengthened) (step S268). It is checked whether the changed distance is a limited value or smaller (step S270). If it is, the flow returns to the step S262. If not, the flow returns to the step S256.

If the counted number reaches the predetermined value, the block reference coordinate calculating section 194 calculates block reference coordinates between the detected pattern codes (step S272). This calculation is carried out using the error minimizing method described above.

It is then determined whether all the reference coordinates of one block, that is, the points of four corners of the block are all detected (step S274). If not, the flow returns to the step S256, and the above processing is repeated.

If all the reference coordinates of one block are detected, the data code reading coordinate calculating section 196 calculates reading coordinates of data codes within the block on the basis of the reference coordinates (step S276). This means that the block is divided into lattice at which intervals the data codes are printed.

After that, the data code reading section 198 reads data in accordance with the reading coordinates (step S278).

When the processing for one block is completed, the flow returns to step S256 and the above-described processing is repeated. If the processing for all blocks included in the frame is completed, it is determined in step S256 that there are no unused markers and thus the processing ends.

It is likely that some of pattern codes will be missing. In this case, as shown in FIG. 31, the reference coordinates can be detected using dots 202 of pattern codes 120 close to dots 200 of the missing pattern codes arranged on the line for search. If the reference coordinates are detected with pattern codes missing, the number of dots of the pattern codes 120 is naturally reduced and thus the detecting precision is lowered. To prevent this, the pattern codes 120 near to the missing ones are employed.

FIG. 32 is a block diagram of the constitution of an information reproduction system for reading data from the pattern codes arranged as shown in FIG. 31.

Referring to FIG. 32, an image input section 186 picks up an image of two-dimensional codes printed on a recording medium. The image is binarized and stored in a frame memory 188.

A marker's approximate center calculating section 190 calculates coordinates of approximate center of a marker based on data stored in the frame memory 188. A pattern code extracting section 192 extracts pattern codes located within a predetermined distance from the approximate center. An extracted pattern code number counter 204 counts the number of dots of the extracted pattern codes. A determining section 206 compares the counted number with a predetermined threshold value and, when the former does not reach the latter, causes the pattern code extracting section 192 to supplement insufficient dots with those of other pattern codes.

A block reference coordinate calculating section 194 calculates the real center, i.e., the block reference coordinates of a marker from the extracted pattern codes using the error minimizing method. A data code reading coordinate calculating section 196 calculates the reading coordinates of data codes based on the calculated block reference coordinates. A data code reading section 198 reads the data codes stored in the frame memory 188 in accordance with the reading coordinates and then outputs them. After that, the operations of demodulation, deinterleave, error correction/detection, etc., as disclosed in International Publication No. WO 94/08314, are performed thereby to reproduce the original multimedia information.

FIG. 33 is a flowchart of data reading processing for one frame in the information reproduction system shown in FIG. 32.

First, the image input section 186 binarizes a frame image and stores it in the frame memory 188 (step S282). The marker's approximate center coordinate calculating section 190 extracts a plurality of markers based on data stored in the frame memory 188 and calculates coordinates of approximate centers of the extracted markers by the well-known technique (step S284).

The pattern code extracting section 192 determines whether an unused marker is present or not (step S286). If there is a marker to be processed, then pattern codes located within a block and a predetermined distance from the approximate center of the marker are detected (step S288), and the counter 204 counts the extracted pattern codes (step S290). The determining section 296 determines whether the counted number reaches a predetermined value (step S292). If not, the pattern code extracting section 192 detects pattern codes outside the block (step S294), and the counter 204 adds the number of the detected pattern codes to the counted number (step S296). The determining section 206 determines again whether the counted number reaches the predetermined value (step S298). If not yet, it is determined that the block cannot be processed, and the flow returns to the step S286, in which the next block is processed.

If it is determined in step S292 or S298 that the counted value amounts to the predetermined value, then the block reference coordinate calculating section 194 calculates block reference coordinates using the detected pattern codes (step S300). This calculation is performed by the foregoing error minimizing method such as the least square approximation.

If one block reference coordinate is obtained, then it is determined whether the points of four corners of the block are all detected (step S302). If not, the flow returns to the step S286, and the above processing is repeated.

If all the reference coordinates of one block are detected, the data code reading coordinate calculating section 196 calculates reading coordinates of data codes within the block based on the reference coordinates (step S304), and the data code reading section 198 reads data in accordance with the reading coordinates (step S306).

When the processing for one block is completed, the flow is returned to step S286 and the above-described processing is repeated. If the processing for all blocks included in the frame is completed, it is determined in step S286 that there are no unused markers, and the processing for all the blocks ends.

Figure 34:
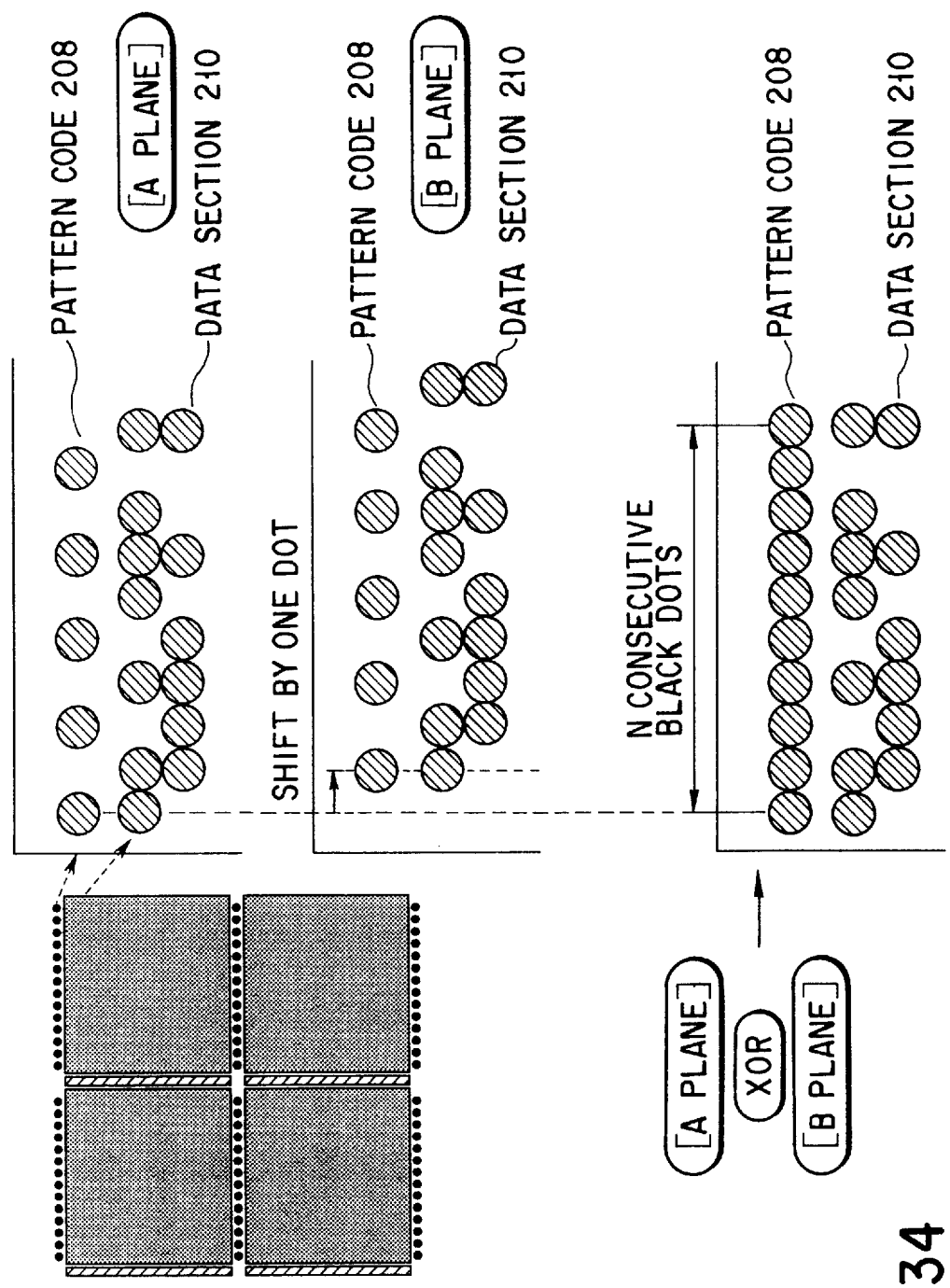
FIG. 34 is a view for explaining an example of reading data using only pattern codes but not markers.

An example where data is read only by pattern codes without using any markers, will now be described. In this example, as illustrated in FIG. 34, pattern codes 208 are arranged on boundaries of a rectangular block and includes alternate black and white dots. On the contrary, a data section 210 includes data codes which are modulated so as not to have a pattern of alternate black and white dots. In other words, the pattern codes 208 are recorded in a periodic code system, while the data codes of the data section 210 are done in an aperiodic code system.

An image of a two-dimensional code pattern containing these pattern codes 208 and data codes is picked up and stored in a memory as an A-plane image. An image formed by shifting the A-plane image by one dot, is stored in a memory as a B-plane image. If these A- and B-plane images are exclusive-ORed (XOR) and stored in a memory, then the pattern codes are all constituted by consecutive black dots, whereas the data section 210 never includes more than a predetermined number of consecutive black dots since, as described above, a pattern of alternate black and white dots is inhibited. Assuming that the number of black and white dots of the pattern codes 208 is N, the number of consecutive black dots is always smaller than N in the data section 210. Therefore, the locations of the pattern codes 208 can be calculated by detecting N consecutive black dots.

After that, using image data of the A plane stored in the memory, the reference coordinates of the block are obtained by the error minimizing method and thus the reading coordinates can be calculated.

FIG. 35 is a block diagram of the constitution of an information reproduction system for reading data from the pattern codes shown in FIG. 34, and FIG. 36 is a flowchart of the operation of the information reproduction system.

Referring to FIGS. 35 and 36, an image input section 212 picks up an image of an information recording medium printed with a two-dimensional code pattern including pattern codes 208 having alternate black and white dots, and the image is binarized and stored in a first memory (memory 1) 214 as an A-plane image (step S312). A one-dot shifted image generating section 216 shifts the image stored in the first memory 214 by one dot in a predetermined direction to form a B-plane image, and the B-plane image is stored in a second memory (memory 2) 218 (step S314). An exclusive-OR calculating section 220 exclusive-ORs two bit map data items stored in these first and second memories 214 and 218, and a result thereof is stored in a third memory (memory 3) 222 (step S316).

A consecutive pattern code number counting section 224 counts the number of consecutive black dots from data stored in the third memory 222 (step S318). A pattern code location detecting section 226 determines whether the counted number is a predetermined value or more (step S320). If it is so, a range between both ends of the consecutive black dots is stored as a pattern code area where the pattern codes 208 are arranged (step S322). After that or when it is determined in step S320 that the counted value does not reach the predetermined value, it is determined whether the processing of one frame is completed or not (step S324). If not yet, the flow returns to step S318.

When the processing of one frame is completed, it is determined whether the entire area is used or not, in other words, all blocks including in the frame are processed or not (step S326). If not yet, a pattern code 208 is detected from image data of the first memory 214 corresponding to the pattern code area stored in the third memory 222, and a block reference coordinate generating section 228 calculates block reference coordinates using the detected pattern code 208 (step S328). A data code reading coordinate generating section 230 calculates reading coordinates of data codes within the block based on the calculated block reference coordinates, and a data code reading section 232 reads data codes from the first memory 214 (step S330). Thereafter, the operations of demodulation, deinterleave, error correction/detection, etc., as disclosed in International Publication No. WO 94/08314, are performed thereby to reproduce the original multimedia information.

When the processing for one block is completed, the flow is returned to step S326 and the above-described processing is repeated. If the processing for all blocks of the frame is completed, it is determined in step S326 that all the pattern code area is used, and the processing ends.

According to the example shown in FIGS. 35 and 36, the reference coordinates calculation can be simplified, and the recording density (capacity) can be increased since no markers are employed.

In this example, an inclination for shifting an image by one dot has to be corrected beforehand using some method.

Figure 37:
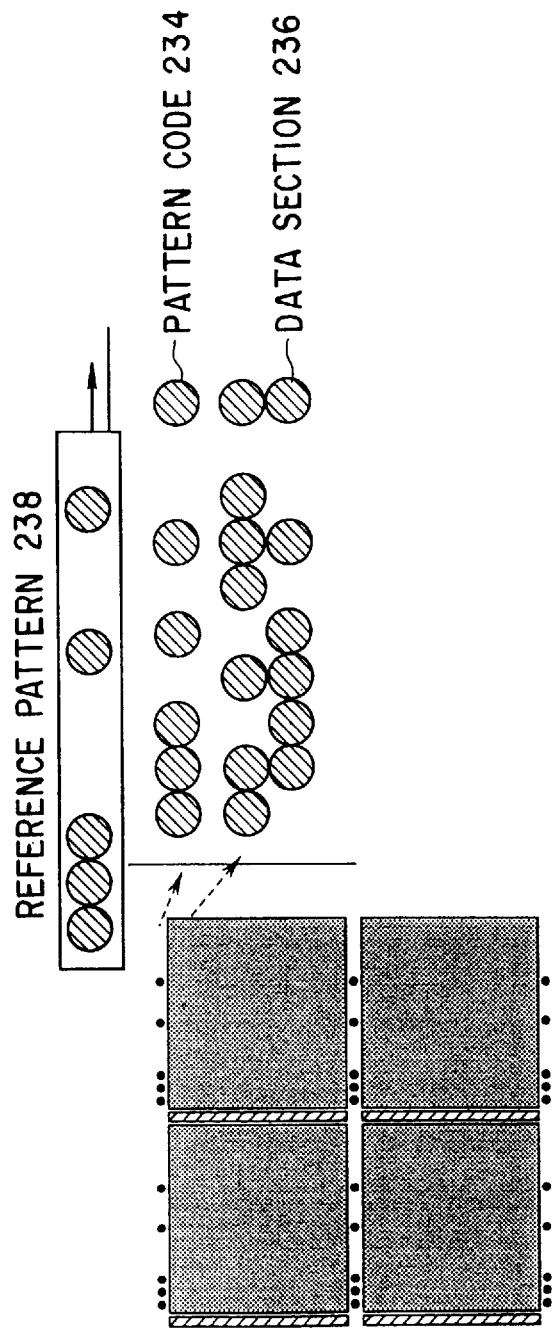
FIG. 37 is a view showing Barker codes and two-dimensional pattern codes formed by the Barker codes.

In place of the above-described pattern of alternate black and white dots, a correlation pattern of strong autocorrelation and weak crosscorrelation can be used. For example, as shown in FIG. 37, a pattern code 234 is constituted by a Barker code, and a data section 236 is modulated to have an arrangement other than the Barker code, thereby allowing markers to be deleted. In other words, the pattern code 234 can be recorded in a code system with correlation, while data codes of the data section 236 are done in a code system having no correlation.

The Barker code is, as shown in FIG. 37, represented by "+++---+--+-" when code length N is "11". If "+" is "1" (black dot) and "-" is "0" (white dot), it is given by "11100010010" (black, black, black, white, white, white, black, white, white, black, white). The correlation value φ of the Barker code is generally expressed as follows.

$$\phi(K) = \sum_{i=1}^{N-K} X_i X_{i+K} = \begin{cases} 0 & :K \leq -N \\ 0, \pm 1 & :K = -1, -2, -3, \ldots, -N-1 \\ N & :K = 0 \\ 0, \pm 1 & :K = 1, 2, 3, \ldots, N-1 \\ 0 & :K \geq N \end{cases}$$

where K is an amount of shift between reference pattern 238 and pattern code 234.

Figure 38:
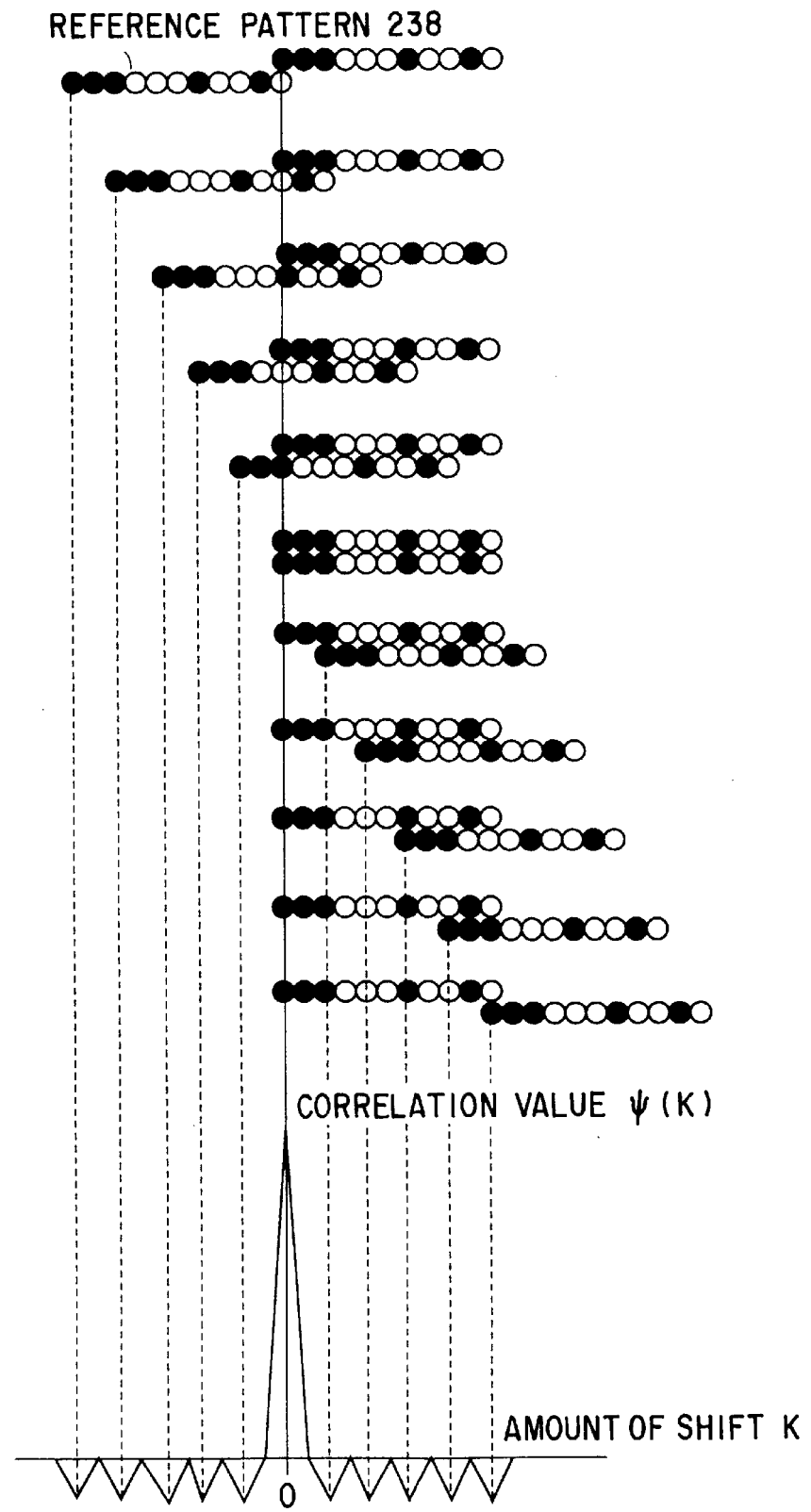
FIG. 38 is a view representing correlative values between Barker codes and reference patterns having the same arrangement.

As illustrated in FIG. 38, the Barker code and reference pattern 238 having the same arrangement are correlated with each other. When they coincide, the correlation value has its peak. More specifically, the reference pattern 238 is scanned by shifting picked-up images dot by dot to detect the peak of the correlation value. It is thus possible to determine the location of the pattern code 234. Thus, the reference coordinates of a block are obtained using the foregoing error minimizing method and accordingly the reading coordinates can be calculated.

Figure 40:
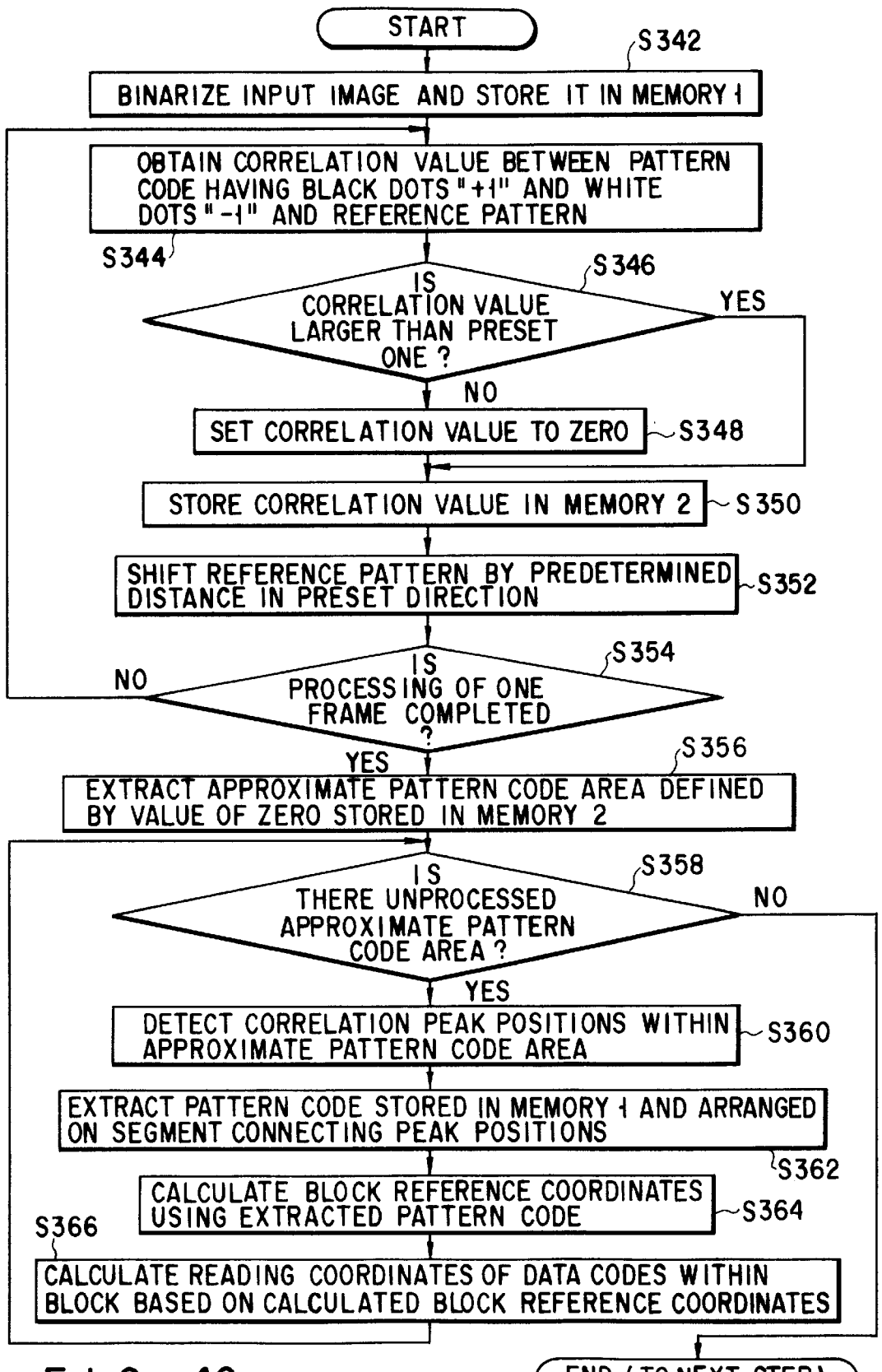
FIG. 40 is a flowchart of data reading processing in the system shown in FIG. 39.

FIG. 39 is a block diagram of the constitution of an information reproduction system for reading data from the pattern codes shown in FIG. 37, and FIG. 40 is a flowchart of the operation of the information reproduction system.

An image input section 240 picks up an image of an information recording medium printed with a two-dimensional code pattern including a pattern code 234 of the Barker code as shown in FIG. 37, and the image is binarized and stored in a first memory (memory 1) 242 (step S342).

A correlation calculating section 244 calculates a correlation value between pattern code 234 constituted of black dots "+1" and white dots "−1" and reference pattern 238 stored in a reference pattern storing ROM 246 (step S344). It is determined whether the correlation value is larger than a preset one (step S346). If it is not larger, the correlation value is set to zero (step S348) and, if it is larger, the correlation value is stored in a second memory (memory 2) 248 (step S350). After that, the reference pattern is shifted by predetermined distance in a predetermined direction (step S352), and then it is determined whether the processing of one frame is completed or not (step S354). If it is not yet, the flow returns to step S344, and the above processing is repeated.

When the processing of one frame is completed, an approximate pattern code area extracting section 250 extracts an approximate pattern code area defined by the value of zero stored in the second memory 248 (step S356). A peak position detecting section 252 determines whether there is an unprocessed approximate pattern code area (step S358). If YES in step S358, the section 252 detects correlation peak positions within the approximate pattern code area (step S360). A pattern code location detecting section 254 extracts the pattern code 234 stored in the first memory 242 and arranged on the segment connecting the peak positions (step S362), and a block reference coordinate generating section 256 calculates block reference coordinates using the extracted pattern code 234 (step S364). A data code reading coordinate generating section 258 calculates reading coordinates of data codes within the block based on the block reference coordinates, and a data code reading section 260 reads data codes from the first memory 242 (step S366). Thereafter, the operations of demodulation, deinterleave, error correction/detection, etc., as disclosed in International Publication No. WO 94/08314, are performed thereby to reproduce the original multimedia information.

When the processing for one block is completed, the flow is returned to step S358 and the above-described processing is repeated. If the processing for all blocks of the frame is completed, it is determined in step S358 that there are no unprocessed approximate pattern code areas, and the processing ends.

According to the example shown in FIGS. 39 and 40, the reference coordinate calculation can be simplified, and the recording density (capacity) can be increased since no markers are employed.

In this example, too, an inclination has to be corrected beforehand using some method.

Figure 41:
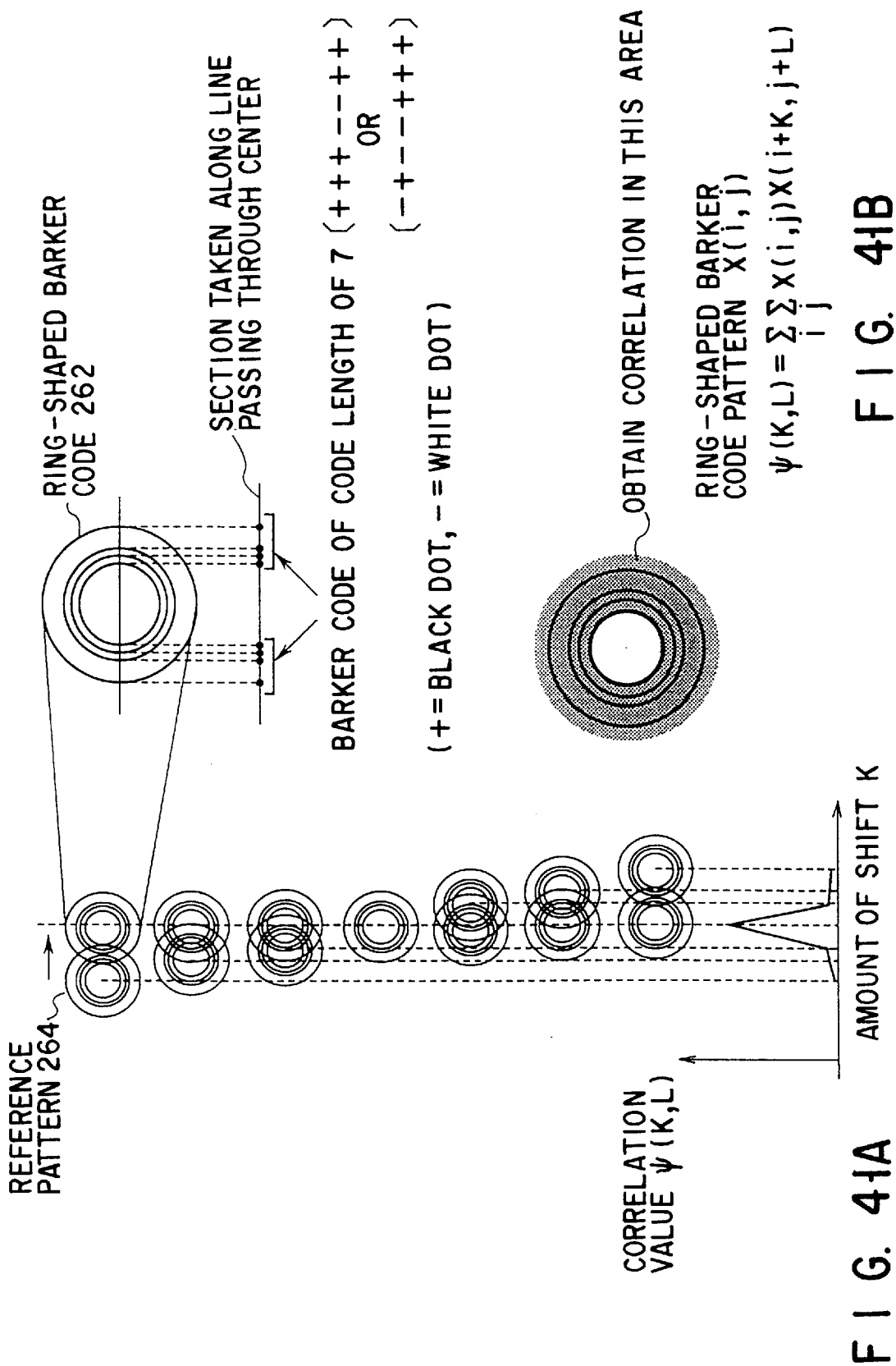
FIG. 41A is a view representing a correlative value between a ring-shaped Barker code and a reference patterns having the same arrangement.
FIG. 41B is a view showing a region for obtaining the correlative value of the ring-shaped Barker code.

To neglect such an inclination, a ring-shaped Barker code 262 can be formed by circularly arranging Barker codes as shown in FIG. 41A. The section taken along the line passing through the center of the Barker code 262 exhibits two Barker codes arranged in opposite directions. If, therefore, the Barker code 262 is correlated with its corresponding reference pattern 264 in a meshed region as shown in FIG. 41B, a correlation peak appears when they coincide with each other.

The correlation value φ of the ring-shaped Barker code 262 is generally expressed as follows.

$$\phi(K, L) = \sum_i \sum_j X(i, j) X(i+K, j+L)$$

where K and L indicate amounts of shift between reference pattern 264 and Barker code 262 in X and Y directions, respectively.

FIG. 42 shows an example where pattern codes 266 formed by the foregoing ring-shaped Barker codes are arranged at four corners of a block. In this example, the reference coordinates of the block correspond to the centers of the ring-shaped Barker codes. The Barker codes are sequentially correlated with their corresponding reference patterns 264. When they coincide, a correlation peak appears. By detecting this peak, the block reference coordinates of the four corners can be obtained. After that, as described above, the reading coordinates of each data dot can be calculated from these block reference coordinates.

Figure 44:
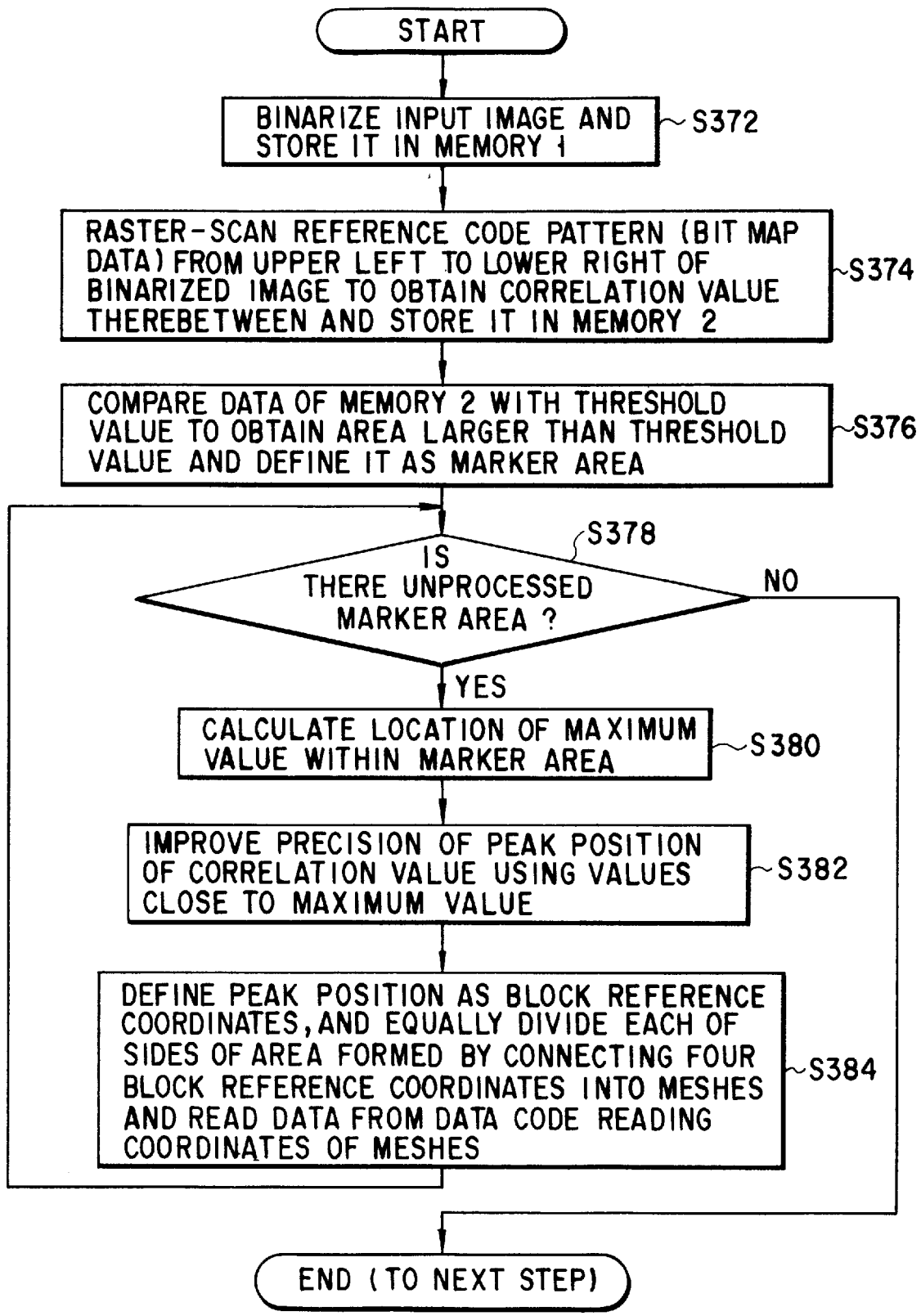
FIG. 44 is a flowchart of data reading processing in the system shown in FIG. 43.

FIG. 43 is a block diagram of the constitution of an information reproduction system for reading data from the pattern codes shown in FIG. 42, and FIG. 44 is a flowchart of the operation of the information reproduction system.

An image input section 268 picks up an image of an information recording medium printed with a two-dimensional code pattern including pattern codes 266 formed by the ring-shaped Barker code as shown in FIG. 42, and the image is binarized and stored in a first frame memory (memory 1) 270 (step S372).

A reference pattern correlation calculating section 272 raster-scans a reference code pattern (bit map) 264 from the upper left to the lower right of the binarized image and calculates a correlation value between the reference code pattern 264 and the image, and the correlation value is stored in a second frame memory (memory 2) 274 (step S374). An approximate block reference area extracting section (threshold comparing section) 276 compares the data of the second frame memory 274 with a threshold value to obtain an area larger than the threshold value and define it as a marker area (step S376).

A block reference coordinate calculating section (peak position detecting section) 278 determines whether there is an unprocessed marker area (step S378). If YES in step S378, the section 278 calculates a location of the maximum value within the marker area (step S380). The precision of the peak position of the correlation value is improved using values close to the maximum value (step S382). This peak position is defined as block reference coordinates. A data code reading coordinate generating section 280 equally divides each of sides of an area formed by connecting four block reference coordinates into meshes. These meshes are defined as data code reading coordinates. Thus, a data code reading section 282 reads data codes from the first frame memory 270 (step S384). After that, the operations of demodulation, deinterleave, error correction/detection, etc., as disclosed in International Publication No. WO 94/08314, are performed thereby to reproduce the original multimedia information.

When the processing for one block is completed, the flow is returned to step S378 and the above-described processing is repeated. If the processing for all blocks of the frame is completed, it is determined in step S378 that there are no unprocessed marker areas, and the processing ends.

The above-described ring-shaped Barker code 262 has a space in its central part. As illustrated in FIG. 45, therefore, the space can be determined as a data code area. In other words, each ring-shaped Barker code includes one dot of data codes 284.

FIG. 46 is a block diagram of the constitution of an information reproduction system for reading data from the data codes shown in FIG. 45, and FIG. 47 is a flowchart of the operation of the information reproduction system.

An image input section 268 picks up an image of an information recording medium printed with a two-dimensional code pattern as shown in FIG. 45, and the image is binarized and stored in a first frame memory (memory 1) 270 (step S392).

A reference pattern correlation calculating section 272 raster-scans a reference code pattern (bit map) 264 from the upper left to the lower right of the binarized image and calculates a correlation value between the reference code pattern and the image, and the correlation value is stored in a second frame memory (memory 2) 274 (step S394). After that, an approximate data code reading area extracting section (threshold comparing section) 286 compares the data of the second frame memory 274 with a predetermined threshold value to obtain an area larger than the threshold value and define it as a data code area (step S396).

A data code reading coordinate calculating section (peak position detecting section) 288 determines whether there is an unprocessed data code area (step S398). If YES in step S398, the section 288 searches the data code area for a location of the maximum value (step S400). If there are a plurality of maximum values, one of them is selected. The position of the selected maximum value is defined as data code reading coordinates, and a data code reading section 282 reads data codes from the first frame memory 270 (step S402). Thereafter, the operations of demodulation, deinterleave, error correction/detection, etc., as disclosed in International Publication No. WO 94/08314, are performed thereby to reproduce the original multimedia information.

After that, the flow returns to step S398 and the above processing is repeated. If all the data code areas are processed, the processing ends.

The present invention is not limited to the above-described embodiments. Various changes and modifications can be made without departing from the scope of the subject matter of the present invention. The subject matter is summarized as follows:

(1) An information recording medium comprising a two-dimensional code having a plurality of dots arranged twodimensionally, wherein at least two of the plurality of dots are arranged so as to have a preset positional relationship therebetween.

Since at least two dots are arranged so as to have a preset positional relationship, the position of each of the dots can be detected with high precision.

(2) An information recording medium comprising a two-dimensional code having a plurality of dots arranged twodimensionally, wherein the two-dimensional code includes pattern matching dot groups each having at least two of the plurality of dots arranged so as to have a preset positional relationship therebetween.

Since the pattern matching dot groups each have at least two of the plurality of dots, they can easily be detected, and the positions of the dots can be calculated at high speed and with high precision.

(3) An information recording medium comprising a two-dimensional code having a plurality of dots arranged two-dimensionally, wherein the two-dimensional code includes data dots (dot groups) arranged in accordance with contents of information and pattern matching dot groups arranged so as to have a preset positional relationship other than that of the data dots (dot groups).

Since the pattern matching dots are arranged so as to have a preset positional relationship, they can easily be detected, and the positions of the data dots can be calculated at high speed and with high precision based on the detected pattern matching dots.

(4) An information recording medium comprising a two-dimensional code having a plurality of dots arranged two-dimensionally, wherein the two-dimensional code includes data dots (dot groups) arranged in accordance with contents of information, markers recorded discriminably from the data dots (dot groups), and pattern matching dots (dot groups) arranged so as to have a preset positional relationship other than that of the data dots (dot groups).

Since the markers are formed discriminably from the data dots (dot groups), their positions can easily be detected, and the positional relationship of the pattern matching dots can be calculated with high precision based on the detected markers. Moreover, the plurality of data dots can be detected with high precision using the relative positional relationship among these pattern matching dots.

(5) An information recording medium described in any one of above items (1) to (4), wherein the two-dimensional code includes a plurality of blocks arranged two-dimensionally and each having a plurality of dots.

The plurality of blocks enable information to be read at random.

(6) An information recording medium described in above item (5), wherein the two-dimensional code is recorded varying in a mode (color) of the dots or that of the blocks between adjacent blocks in order to separate the blocks from each other.

The blocks can be constituted without decreasing in recording density.

(7) An information recording medium described in above item (6), wherein the two-dimensional code is recorded varying in density between the adjacent blocks when the mode is set in the density and varying in color therebetween when the mode is set in the color.

The blocks can be constituted without decreasing in recording density.

(8) An information recording medium described in above item (4), wherein the markers are recorded differing from the data dots (dot groups) in one of area, shape, color, fluorescence, and magnetism.

The positions of the markers can easily be detected.

(9) An information recording medium described in above item (3) or (4), wherein at least some of the data dots (dot groups) are spaced away from the others thereof, and the pattern matching dots (dot groups) are arranged between the data dots (dot groups) without contacting the data dots (dot groups).

The pattern matching dots can be arranged without reducing in recording density.

(10) An information recording medium described in any one of above items (2) to (4), wherein all or some of the pattern matching dots (dot groups) are recorded in a code system discriminably from the data dots (dot groups).

The pattern matching dots can easily be detected.

(11) An information recording medium described in above item (10), wherein the pattern matching dots (dot groups) are recorded in a periodic code system and the data dots (dot groups) are recorded in an aperiodic code system in order to discriminate therebetween.

The pattern matching dots can easily be detected.

(12) An information recording medium described in above item (10), wherein the pattern matching dots (dot groups) are recorded in a code system having correlation and the data dot groups are recorded in a code system free of correlation in order to discriminate therebetween.

The pattern matching dots can easily be detected.

(13) An information recording medium described in any one of above items (2) to (4), wherein all or some of the pattern matching dots (dot groups) are recorded in an area where the data dot groups are recorded.

The pattern matching dots can be arranged without reducing in recording density.

(14) An information recording medium described in any one of above items (2) to (4), wherein some of the pattern matching dots (dot groups) include markers having a recording mode different from that of markers of the other pattern matching dot groups.

Since the markers are formed discriminably from the data dots (dot groups), their positions can easily be detected, and the positional relationship of the pattern matching dots can be calculated with high precision based on the detected markers. Moreover, the plurality of dots can be detected with high precision using the relative positional relationship among these dot groups.

(15) An information recording medium described in above item (14), wherein each of the markers includes at least one pattern matching dot in a discriminable manner.

The markers can easily be detected, thus improving in recording density.

(16) An information recording medium described in any one of above items (2) to (4) and (14), wherein the pattern matching dot groups are recorded separately to be prevented from interacting with each other.

The coordinates of the centers of the pattern matching dots can easily be calculated.

(17) An information recording medium described in any one of above items (1) to (4), wherein at least two dots are arranged and recorded such that a provisional reference point is set within the two-dimensional code, an ideal point corresponding to at least two dots are obtained based on both the provisional point and the preset positional relationship, a position of the provisional point is corrected so as to minimize a difference between the ideal point and an actual point corresponding to at least two dots, and a (real) reference point for reading at least two dots or other dots is set.

Since the position of the provisional reference point is corrected so as to minimize the difference therebetween and the (real) reference point is set, the positions of the plurality of dots can be detected with high precision.

(18) A two-dimensional code comprising a plurality of dots arranged two-dimensionally, wherein at least two of the plurality of dots are arranged so as to have a preset positional relationship therebetween.

Since at least two dots are arranged so as to have a preset positional relationship, the positions of all dots can be detected with high precision based on the positional relationship.

(19) A two-dimensional code comprising a plurality of dots arranged two-dimensionally, wherein the two-dimensional code includes pattern matching dots (dot groups) each having at least two of the plurality of dots arranged so as to have a preset positional relationship therebetween.

Since at least two dots of the pattern matching dots are arranged so as to have a preset positional relationship therebetween, the pattern matching dots can easily be detected, and the positions of the dots can be calculated at high speed and with high precision.

(20) A two-dimensional code having a plurality of dots arranged two-dimensionally, comprising data dots (dot groups) arranged in accordance with contents of information and pattern matching dots (dot groups) arranged so as to have a preset positional relationship other than that of the data dots (dot groups).

Since the pattern matching dots are arranged so as to have a preset positional relationship, they can easily be detected, and the positions of the dots can be calculated at high speed and with high precision.

(21) A two-dimensional code having a plurality of dots arranged two-dimensionally, comprising data dots (dot groups) arranged in accordance with contents of information, markers recorded discriminably from the data dots (dot groups), and pattern matching dots (dot groups) arranged so as to have a preset positional relationship other than that of the data dots (dot groups).

Since the markers are formed discriminably from the data dots (dot groups), their positions can easily be detected, and the positional relationship of the pattern matching dots can be calculated with high precision based on the detected markers. Moreover, the pattern matching dots can be detected with high precision using the relative positional relationship among these dot groups.

(22) An information reproduction system for reproducing a two-dimensional code optically readable and recorded with high density, comprising:

input means for optically picking up an image of an information recording medium including a two-dimensional code and inputting the two-dimensional code as a video signal, the two-dimensional code having a plurality of dots arranged two-dimensionally based on a format representing a preset positional relationship (coordinates);

position information calculating means for calculating position information (provisional position information: reference coordinates) from the two-dimensional code input as the video signal by the input means;

format storing means for storing the format; and coordinate calculating means for calculating position coordinates (absolute coordinates) of each of the plurality of dots of the two-dimensional code from both the position information (provisional position information: reference coordinates) calculated by the position information calculating means and the preset positional relationship (coordinates) of the format stored in the format storing means.

The position coordinates of the respective dots can be detected with high precision by obtaining the relative positional relationship between coordinate groups read from the two-dimensional code and those stored beforehand in the format storing means.

(23) An information reproduction system described in above item (22), wherein the coordinate calculating means includes means for comparing the position information calculated by the position information calculating means and the positional relationship of the format stored in the format storing means, and calculating the position coordinate of each of the plurality of dots such that a square error is minimized.

The position coordinates of the respective dots can be detected with high precision by correcting coordinate groups read from the two-dimensional code so as to minimize a square error of the relative positional relationship between the coordinate groups and those stored beforehand in the format storing means.

(24) An information reproduction system described in one of above items (22) and (23), wherein the input means includes binarizing means for binarizing a video signal.

The processing of the coordinate calculating means can easily be executed at high speed.

(25) An information reproduction system described in above item (22), wherein the information recording medium includes a two-dimensional code constituted by pattern matching dots (dot groups) each having at least two of the plurality of dots arranged to have a preset positional relationship; the position information calculating means includes pattern detecting means for detecting the pattern matching dots (dot groups) and pattern position information detecting means for detecting pattern position information of the pattern matching dots (dot groups) detected by the pattern detecting means; and the coordinate calculating means includes relative position coordinate calculating means for calculating a relative positional relationship and relative coordinates of the pattern matching dots (dot groups) based on the pattern position information and the positional relationship of the format.

Since the coordinate groups are read from the two-dimensional code using at least two pattern matching dots, the position information calculating means can easily be constituted and its operation can be carried out at high speed.

(26) An information reproduction system described in above item (22), wherein the information recording medium includes a two-dimensional code constituted by data dots (dot groups) indicative of information and pattern matching dots (dot groups) each having at least two dots arranged to have a preset positional relationship other than that of the data dots (dot groups); the position information calculating means includes pattern detecting means for detecting the pattern matching dots (dot groups) and pattern position information detecting means for detecting pattern position information of the pattern matching dots (dot groups) detected by the pattern detecting means; and the coordinate calculating means includes relative position coordinate calculating means for calculating a relative positional relationship and relative coordinates of the pattern matching dots (dot groups) based on the pattern position information and the positional relationship of the format.

Since the coordinate groups are read from the two-dimensional code using at least two pattern matching dots, the position information calculating means can easily be constituted and its operation can be carried out at high speed.

(27) An information reproduction system described in above item (22), wherein the information recording medium includes a two-dimensional code constituted by data dots (dot groups) indicative of information, markers recorded discriminably from the data dots (dot groups), and pattern matching dots (dot groups) each having at least two dots arranged to have a preset positional relationship other than that of the data dots (dot groups); the position information calculating means includes marker detecting means for detecting the markers, pattern detecting means for detecting the pattern matching dots (dot groups) based on the markers detected by the marker detecting means, and pattern position information detecting means for detecting pattern position information of the pattern matching dots (dot groups) detected by the pattern detecting means; and the coordinate calculating means includes relative position coordinate calculating means for calculating a relative positional relationship and relative coordinates of the pattern matching dots (dot groups) based on the pattern position information and the positional relationship of the format.

Since a range for detecting the pattern matching dots (dot groups) can be defined by detecting the markers, a high-speed operation can be achieved.

(28) An information reproduction system described in any one of above items (25) to (27), wherein the pattern position information detecting means includes centroid detecting means for detecting coordinates of a centroid of each of the dots included in the pattern matching dots (dot groups).

The coordinates of the centers of the pattern matching dots can be obtained by simple circuit arrangement.

(29) An information reproduction system described in any one of above items (25) to (27), wherein the pattern position information detecting means includes center detecting means for detecting coordinates of a center of a rectangle circumscribing the dots included in the pattern matching dots (dot groups).

The coordinates of the centers of the pattern matching dots can be obtained by simple circuit arrangement.

(30) An information reproduction system described in any one of above items (25) to (27), wherein the pattern position information detecting means includes:

pattern estimating means for, when some of the pattern matching dots (dot groups) are not detected, estimating position information of said some of the pattern matching dots (dot groups) based on both the positional relationship of the format and the pattern position information detected by the pattern position information detecting means; and pattern code scanning means for scanning another pattern matching dots based on the position information estimated by the pattern estimating means.

Even when a defect is caused in dots because of stain of the information recording medium or the like, the positions of the dots can be detected with high precision using a necessary and sufficient number of pattern matching dot groups.

(31) An information reproduction system described in above item (23), wherein the coordinate calculating means calculates arbitrary coordinates and a unit vector of a coordinate system of the information recording medium to obtain the position coordinates of each of the plurality of dots of the two-dimensional code.

Even though the pattern matching dot groups are arranged in any positions, the coordinates of the dots can be calculated with high precision.

(32) An information reproduction system described in above item (23), wherein the coordinate calculating means calculates arbitrary coordinates to obtain the position coordinates of each of the plurality of dots of the two-dimensional code.

Even though the pattern matching dot groups are arranged in any positions, the coordinates of the dots can be calculated with high precision.

(33) An information reproduction system described in above item (23), wherein the coordinate calculating means calculates segments connecting two pairs of arbitrary coordinates to obtain the position coordinates of each of the plurality of dots of the two-dimensional code.

The coordinates of the dots can be calculated with high precision by arranging the pattern matching dot groups on the straight lines.

(34) An information reproduction system described in above item (33), wherein the coordinate calculating means calculates an intersection of the segments to obtain the position coordinates of each of the plurality of dots of the two-dimensional code.

The coordinates of the dots can be calculated with high precision by arranging the pattern matching dot groups on the sides of a polygon.

(35) A method of reproducing a two-dimensional code including a plurality of dots optically readable and recorded with high density, comprising the steps of:

setting a provisional reference point within the two-dimensional code having at least two dots arranged and recorded so as to have a preset positional relationship;

obtaining an ideal point corresponding to said at least two dots based on both the provisional point and the preset positional relationship;

correcting a position of the provisional point such that a difference between the ideal point and an actual point corresponding to said at least two dots is minimized and setting a real reference point for reading said at least two dots and other dots; and reproducing information based on the real reference point.

Since the provisional reference point is corrected so as to minimize the difference between the ideal and actual points and the (real) reference point is set, the positions of the dots can be detected with high precision.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information recording medium comprising;

a sheet-shaped member; and a two-dimensional code recorded on said sheet-shaped member in an optically readable manner, said two-dimensional code including:

data dot groups, each data dot group having a plurality of dots which are arranged in a matrix pattern in accordance with a content of data;

provisional reference points which serve as provisional reference positions used for reading the dots in the data dot groups; and sets of at least two dots having a preset positional relationship with said provisional reference points, said sets of at least two dots being arranged so as to determine real reference points which serve as real reference positions used for reading the dots in the data dot groups, wherein said sets of at least two dots arranged to determine the real reference points comprise separate dots which are separately arranged from one another in each of the sets so that a position of each of said provisional reference points is rectified so as to minimize an evaluation value which is obtained from a distance between a suppositional position at which each of the separate dots is supposed to be located and an actual position at which each of the separate dots is actually located, thereby determining a position of a corresponding real reference point.

2. An information recording medium according to claim 1, wherein said two-dimensional code includes a plurality of blocks adjacent to one another, each of the blocks including one of said data dot groups, one of said provisional reference points, and one of said sets of at least two dots.

3. An information recording medium according to claim 2, wherein each of said blocks is recorded separately from adjacent blocks by varying one of (i) modes of the dots in the data dot groups and (ii) modes of the blocks.

4. An information recording medium according to claim 3, wherein:

when said modes are density modes, each of the blocks is recorded separately from the adjacent blocks with densities of adjacent blocks being varied with respect to each other; and when said modes are color modes, each of the blocks is recorded separately from the adjacent blocks with colors of adjacent block being varied with respect to each other.

5. An information recording medium according to claim 1, wherein:

at least part of each of the data dot groups is spaced from a remaining part, with a space being provided therebetween; and said separate dots are arranged in the space provided in a corresponding data dot group without any contact with dots of the corresponding data dot group.

6. An information recording medium according to claim 1, wherein at least some of said separate dots are recorded in a code system so as to be discriminable from the dots in the data dot groups.

7. An information recording medium according to claim 1, wherein all of said separate dots are recorded in a code system so as to be discriminable from the dots in the data dot groups.

8. An information recording medium according to claim 6, wherein:

said separate dots are recorded in a periodic code system; and the dots in said data dot groups are recorded in an aperiodic code system so that said separate dots are discriminated from the dots in said data dot group.

9. An information recording medium according to claim 6, wherein:

said separate dots are recorded in a code system having correlation; and the dots in said data dot groups are recorded in a code system free of correlation, so that said separate dots are discriminated from the dots in said data dot groups.

10. An information recording medium according to claim 1, wherein at least some of said separate dots are recorded in an area where a corresponding data dot group is recorded.

11. An information recording medium according to claim 1, wherein all of said separate dots are recorded in an area where a corresponding data dot group is recorded.

12. An information recording medium according to claim 1, wherein said separate dots include markers which adopt recording modes different from those of said separate dots.

13. An information recording medium according to claim 12, wherein said markers include at least one of corresponding separate dots in discriminable modes.

14. A method of optically reading and reproducing a two-dimensional code, said two-dimensional code being recorded on a sheet-shaped member so as to be optically readable, said two-dimensional code including:

data dot groups in each of which a plurality of dots are arranged in a matrix pattern in accordance with a content of data;

provisional reference points which serve as provisional reference positions used for reading the plurality of dots in the data dot groups; and sets of at least two dots having a preset positional relationship with said provisional reference points, said sets of at least two dots being arranged so as to determine real reference points which serve as real reference positions used for reading the dots in the data dot groups, and wherein said sets of at least two dots arranged to determine the real reference points comprise separate dots which are separately arranged from one another in each of the sets, said method of optically reading and reproducing a two-dimensional code comprising the steps of:

providing said provisional reference points on the two-dimensional code;

searching said separate dots on the basis of the provisional reference points;

rectifying a position of each of the provisional reference points so as to minimize an evaluation value, which is obtained from a distance between a suppositional position at which each of the dots is supposed to be located and an actual position at which each of the dots is actually located, and determining positions of corresponding real reference points; and reading each of the dots in the data dot groups on the basis of said determined corresponding real reference points.

* * * * *